United States Patent
Yang et al.

(10) Patent No.: US 11,079,241 B2
(45) Date of Patent: Aug. 3, 2021

(54) DETECTION OF GPS SPOOFING BASED ON NON-LOCATION DATA

(71) Applicant: Intel Corporation, Santa Clara, CA (US)

(72) Inventors: Liuyang Yang, Portland, OR (US); Manoj Sastry, Portland, OR (US); Yonghong Huang, Portland, OR (US); Xiruo Liu, Portland, OR (US); Noor Abani, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 15/858,706

(22) Filed: Dec. 29, 2017

(65) Prior Publication Data

US 2019/0041223 A1 Feb. 7, 2019

(51) Int. Cl.
| | |
|---|---|
| *G01S 19/21* | (2010.01) |
| *H04W 4/02* | (2018.01) |
| *G01C 21/30* | (2006.01) |
| *H04W 4/44* | (2018.01) |
| *H04W 4/46* | (2018.01) |
| *G08G 1/01* | (2006.01) |
| *G08G 1/0967* | (2006.01) |
| *H04L 29/06* | (2006.01) |
| *H04W 12/122* | (2021.01) |

(Continued)

(52) U.S. Cl.
CPC ............ *G01C 21/30* (2013.01); *G01S 19/215* (2013.01); *G08G 1/0112* (2013.01); *G08G 1/0116* (2013.01); *G08G 1/0129* (2013.01); *G08G 1/096775* (2013.01); *G08G 1/096783* (2013.01); *H04L 63/1466* (2013.01); *H04W 4/025* (2013.01); *H04W 4/44* (2018.02); *H04W 4/46* (2018.02); *H04W 12/122* (2021.01); *H04W 4/20* (2013.01); *H04W 12/104* (2021.01); *H04W 12/63* (2021.01)

(58) Field of Classification Search
CPC .......... G08G 1/096783; G08G 1/0967; G08G 1/0112; G08G 1/0116; G01S 19/215; G01C 21/30; H04L 63/1466; H04W 4/025; H04W 4/44; H04W 4/46; H04W 12/1202
See application file for complete search history.

(56) References Cited

U.S. PATENT DOCUMENTS

| | | | |
|---|---|---|---|
| 10,060,751 B1 * | 8/2018 | Chen | G01C 21/32 |
| 2007/0004102 A1 * | 1/2007 | Dairiki | H01L 27/1266 |
| | | | 438/149 |

(Continued)

FOREIGN PATENT DOCUMENTS

| | | | | |
|---|---|---|---|---|
| WO | WO-2016153435 A1 * | 9/2016 | | G01C 21/16 |

OTHER PUBLICATIONS

Sakr et. al., "V2V and On-Board Sensor Fusion for Road Geometry Estimation", Oct. 19, 2017, IEEE (Year: 2017).*

(Continued)

*Primary Examiner* — Anshul Sood
(74) *Attorney, Agent, or Firm* — Jordan IP Law, LLC

(57) ABSTRACT

An embodiment of a semiconductor package apparatus may include technology to acquire location related information, acquire local area characteristic information, and verify the location related information based on the local area characteristic information. Other embodiments are disclosed and claimed.

25 Claims, 15 Drawing Sheets

(51) Int. Cl.
    *H04W 4/20*     (2018.01)
    *H04W 12/63*    (2021.01)
    *H04W 12/104*   (2021.01)

(56) References Cited

U.S. PATENT DOCUMENTS

2017/0090036 A1* 3/2017 Zalewski .............. G01S 19/215
2017/0215045 A1* 7/2017 Rasal ..................... G01S 5/10
2018/0272993 A1* 9/2018 Johnson ................. B60R 25/33

OTHER PUBLICATIONS

"Intelligent Transport Systems (ITS); Radiocommunications equipment operating in the 5 855 MHz to 5 925 MHz frequency band; Harmonised standard covering the essential requirements of article 3.2 of directive 2014/53/EU", etsi.org/deliver/etsi_en/302500_302599/302571/02.00.00_20/en_302571v020000a.pdf, Mar. 2016, 45 pages.

"Intelligent Transport Systems (ITS); Vehicular communications; Basic set of applications; Part 2: Specification of cooperative awareness basic service", etsi.org/deliver/etsi_en/302600_302699/30263702/01.03.02_60/en_30263702v010302p.pdf, Nov. 2014, 44 pages.

"Intelligent Transport Systems (ITS); Vehicular communications; Basic set of applications; Part 3: Specifications of decentralized environmental notification basic service", etsi.org/deliver/etsi_en/302600_302699/30263703/01.02.02_60/en_30263703v010202p.pdf, Nov. 2014, 73 pages.

Wikipedia, "IEEE 802.11p", en.wikipedia.org/wiki/IEEE_802.11p, Retrieved on Oct. 23, 2014, 4 pages.

"Intelligent Transport Systems (ITS); Vehicular communications; Basic set of applications; Local Dynamic Map (LDM); Rationale for and guidance on standardization", etsi.org/deliver/etsi_tr/102800_102899/102863/01.01.01_60/tr_102863v010101p.pdf, Jun. 2011, 40 pages.

"Release 14", 3gpp.org/release-14, retrieved on Oct. 23, 2017, 2 pages.

* cited by examiner

DETECTION OF GPS SPOOFING BASED ON NON-LOCATION DATA

TECHNICAL FIELD

Embodiments generally relate to autonomous vehicle navigation systems. More particularly, embodiments relate to detection of global position satellite (GPS) spoofing based on non-location data.

BACKGROUND

An autonomous or semi-autonomous vehicle (AV) may include various technologies for perception, such as camera feeds and sensory information. In addition, the vehicles also may use collaborative communications from other vehicles and the intelligent transportation infrastructure to further enhance its perception of the surrounding beyond the immediate reach of the camera and other onboard sensors. Institute of Electrical and Electronics Engineers (IEEE) standard 802.11p defines a physical layer radio standard known as Dedicated short-range communications (DSRC) to support vehicular communications. On top of the IEEE 802.11p standard, IEEE 1609 defines a family of standards for Wireless Access in Vehicular Environments (WAVE) covering several aspects of a vehicular communications stack, from channel managements to security services. Taken together, WAVE/DSRC technology provides communication among the vehicles, and between the vehicle and the roadside units (RSUs) in specific locations (e.g., toll plazas for applications such as electronic fee collection). Similar technology is being developed in Europe as well. For example, Cooperative-Intelligent Transport Systems (C-ITS) is being defined to provide connectivity between vehicles (e.g., car-to-car), between vehicles and fixed locations (e.g., car-to-infrastructure), and between vehicles and other road participants (e.g. car-to-pedestrian).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
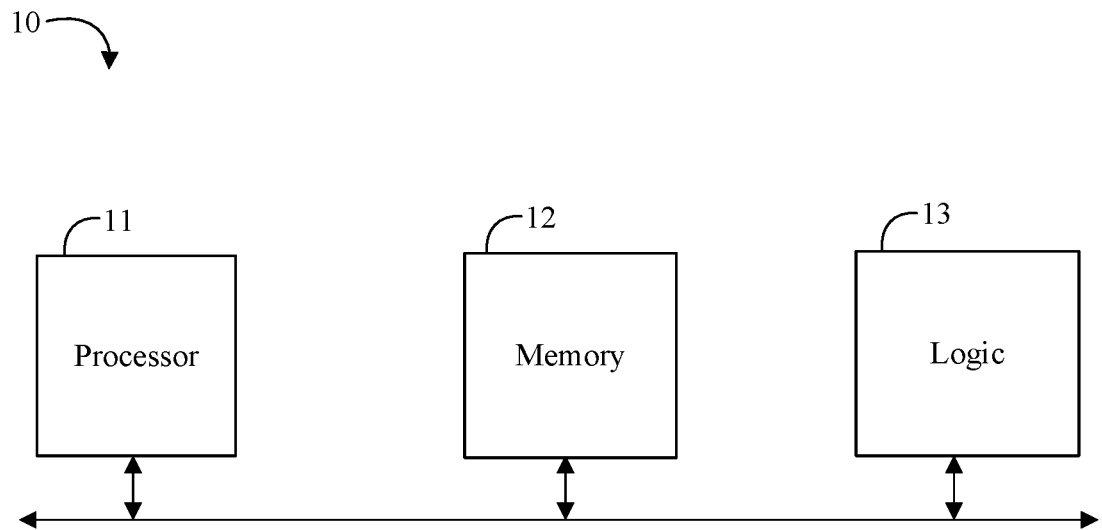
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to acquire location related information, acquire local area characteristic information, and verify the location related information based on the local area characteristic information. In some embodiments, the logic 13 may be configured to acquire the local area characteristic information from one or more of a local source and an external source. For example, the logic 13 may be configured to receive a message from an external source, and extract the local area characteristic information from the received message, or to extract such information from local sensors. In some embodiments, the logic 13 may be further configured to provide the location related information and the local area characteristic information to a trained classifier to verify the location related information based on the local area characteristic information. For example, the local area characteristic information may include one or more of street characteristic information and vehicle behavior information (e.g., a street fingerprint). For example, the street characteristic information may include one or more of yaw rate, heading, and radius of curve, and the vehicle behavior information may include one or more of speed and acceleration. In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, acquiring location related information, acquiring local area characteristic information, verifying the location related information based on the local area characteristic information, etc.).

Figure 2:
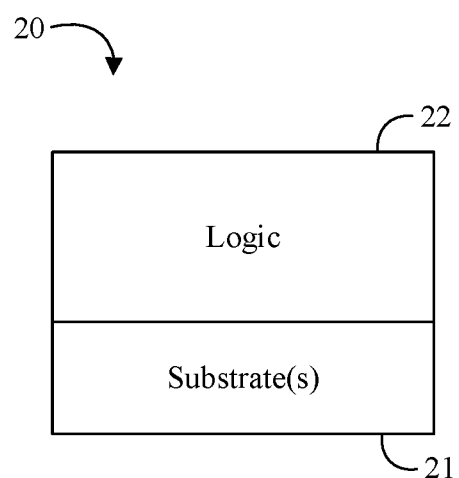
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to acquire location related information, acquire local area characteristic information, and verify the location related information based on the local area characteristic information. In some embodiments, the logic 22 may be configured to acquire the local area characteristic information from one or more of a local source and an external source. For example, the logic 22 may be configured to receive a message from an external source, and extract the local area characteristic information from the received message. In some embodiments, the logic 22 may be further configured to provide the location related information and the local area characteristic information to a trained classifier to verify the located related information based on the local area characteristic information. For example, the local area characteristic information may include one or more of street characteristic information and vehicle behavior information (e.g., a street fingerprint). For example, the street characteristic information may include one or more of yaw rate, heading, and radius of curve, and the vehicle behavior information may include one or more of speed and acceleration. In some embodiments, the logic 22 coupled to the one or more substrates 21 may include transistor channel regions that are positioned within the one or more substrates.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), the method 80 (FIG. 8), or any of the embodiments discussed herein. The illustrated apparatus 20 includes one or more substrates 21 (e.g., silicon, sapphire, gallium arsenide) and logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
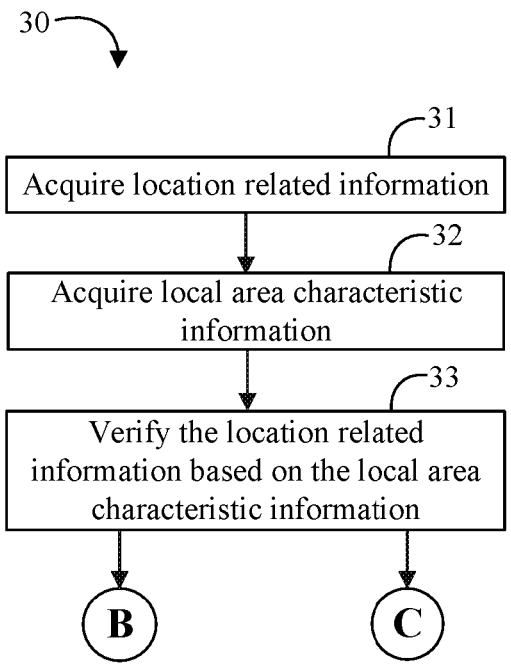
FIGS. 3A to 3C are flowcharts of an example of a method of verifying a location according to an embodiment.
Figure 3B:
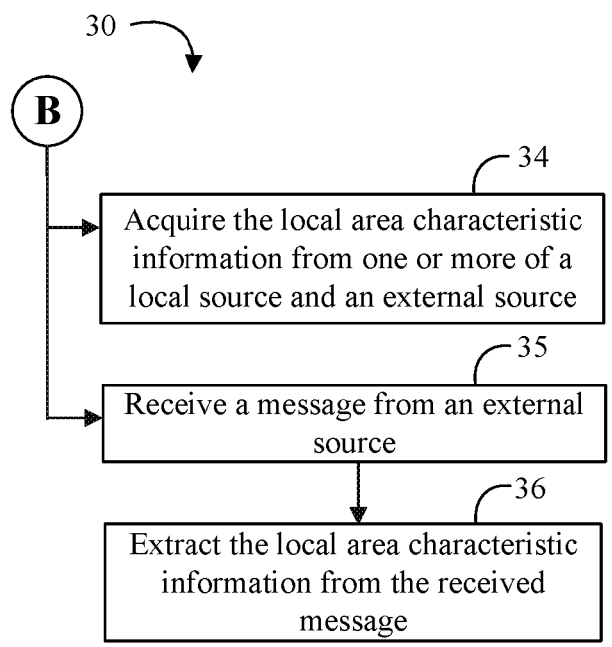
Figure 3C:
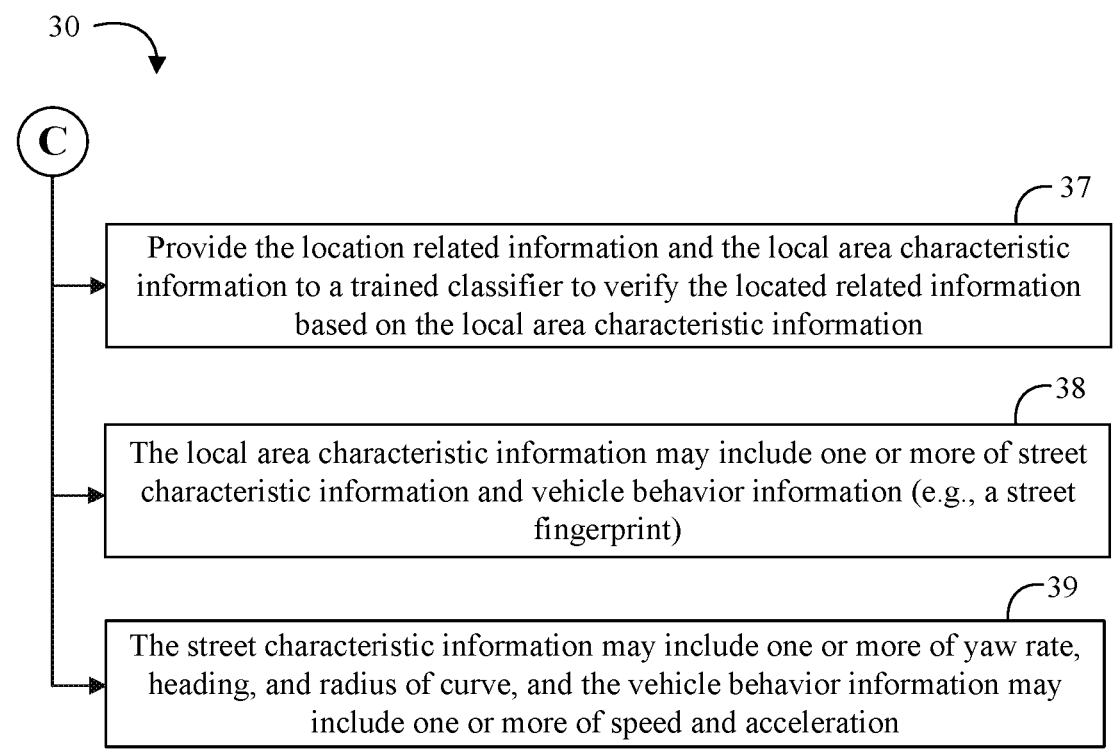

Turning now to FIGS. 3A to 3C, an embodiment of a method 30 of verifying a location may include acquiring location related information at block 31, acquiring local area characteristic information at block 32, and verifying the location related information based on the local area characteristic information at block 33. Some embodiments of the method 30 may include acquiring the local area characteristic information from one or more of a local source and an external source at block 34. For example, the method 30 may include receiving a message from an external source at block 35, and extracting the local area characteristic information from the received message at block 36. Some embodiments of the method 30 may further include providing the location related information and the local area characteristic information to a trained classifier to verify the located related information based on the local area characteristic information at block 37. For example, the local area characteristic information may include one or more of street characteristic information and vehicle behavior information (e.g., a street fingerprint) at block 38. For example, the street characteristic information may include one or more of yaw rate, heading, and radius of curve, and the vehicle behavior information may include one or more of speed and acceleration at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS).

Figure 4:
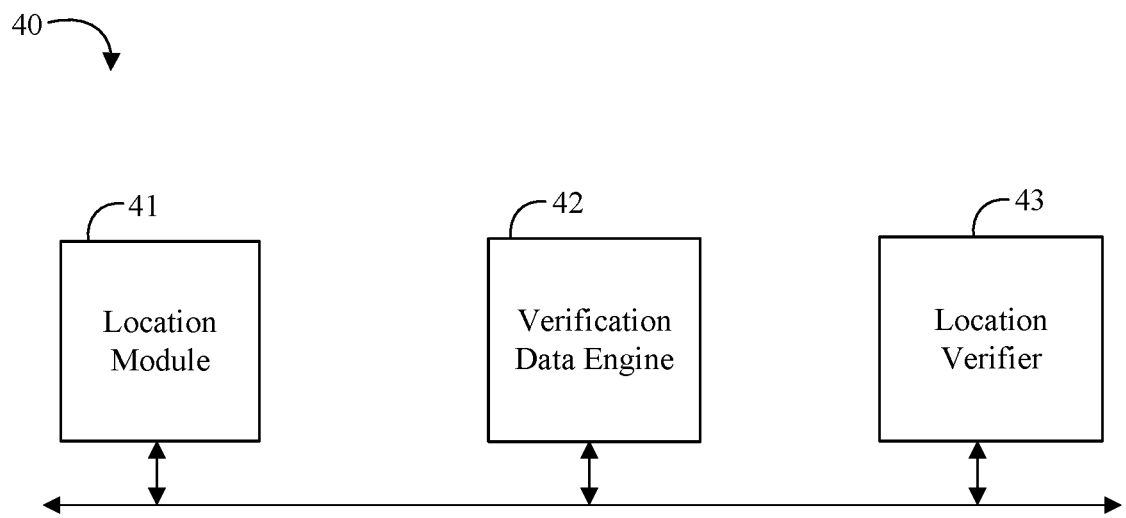
FIG. 4 is a block diagram of an example of location spoofing detector apparatus according to an embodiment.

Turning now to FIG. 4, some embodiments may be physically or logically arranged as one or more modules. For example, an embodiment of a location spoofing detector 40 may include a location module 41, a verification data engine 42, and a location verifier 43. The location module 41 may include technology to acquire location related information.

For example, the location module 41 may include a GPS receiver or may receive location coordinates from a GPS receiver. The location module 41 may also receive location information from external sources such as vehicles or infrastructure (e.g., including road-side units (RSUs)).

The verification data engine 42 may include technology to acquire local area characteristic information. In some embodiments, the verification data engine 42 may include technology to acquire the local area characteristic information from one or more of a local source and an external source. For example, the verification data engine 42 may include or receive information from one or more local sensors which measure data related to street characteristics (e.g., heading, yaw, pitch, radius of curve, etc.) and/or vehicle behavior (e.g., speed, acceleration, etc.). The verification data engine 42 may also include technology to receive a message from an external source (e.g., vehicles, RSUs, etc.), and extract the local area characteristic information from the received message. The local area characteristics may correspond to non-location related information, or non-GPS derived information. For example, local area characteristics may correspond to environmental and/or physical characteristics in the immediate vicinity of the location spoofing detector 40 (e.g., co-located, within a few hundred feet, less than one half mile, etc., depending on the application) which are determined independently of information provided by the GPS receiver.

The location verifier 43 may include technology to verify the location related information based on the local area characteristic information. For example, the location verifier 43 may include a machine learning (ML) classifier trained to verify the location related information based on the local area characteristic information. For example, the location related inputs provided to the trained classifier may include the locally received GPS coordinates, location coordinates received from vehicles, and/or location coordinates received from infrastructure. The local area characteristic inputs provided to the classifier may include the locally sensed street characteristics and/or vehicle behavior, and/or the street characteristic and/or vehicle behavior information received from vehicles and/or infrastructure. In some embodiments, the output of the classifier may be binary (e.g., <true>—the location related information appears to be consistent with the local area characteristic information; or <false>—the location related information appears to be inconsistent with the local area characteristic information). Some embodiments may additionally or alternatively provide a multi-class output from the classifier (e.g., <true>/<false>, and <predicted actual location>).

Embodiments of the location module 41, the verification data engine 42, the location verifier 43, and other components of the location spoofing detector 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 5:
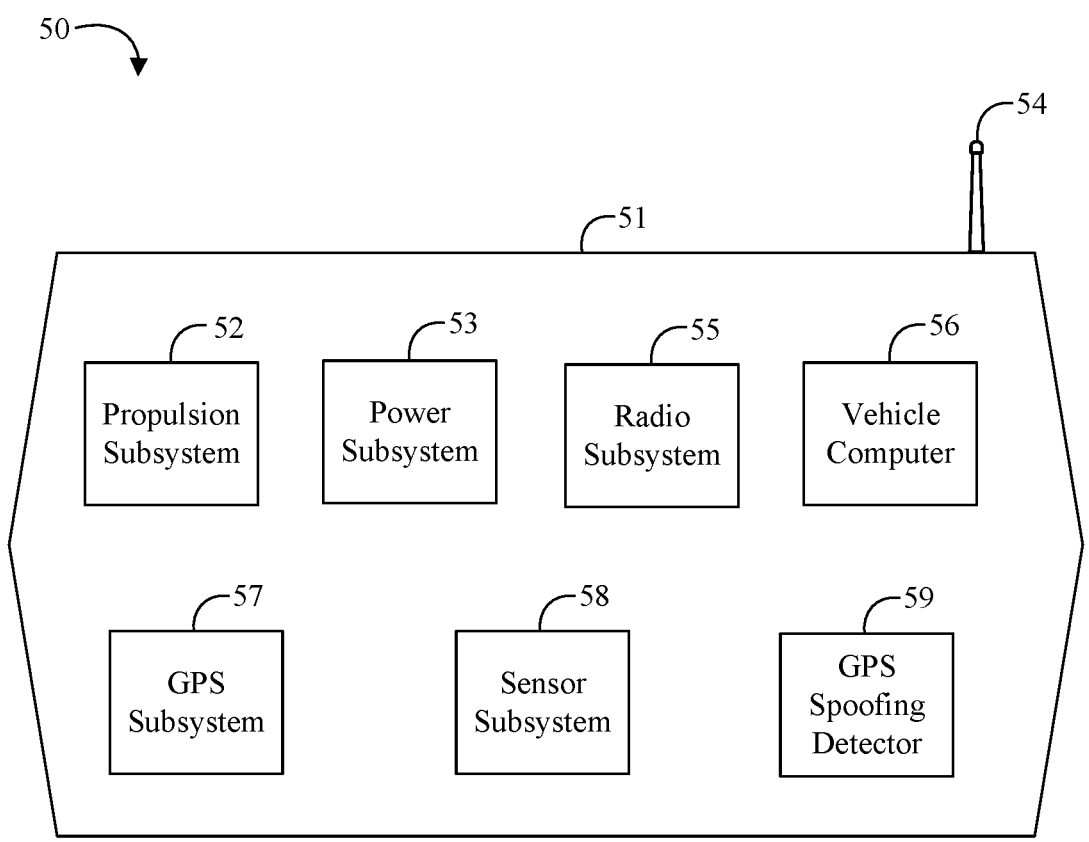
FIG. 5 is a block diagram of an example of an autonomous vehicle according to an embodiment.

Turning now to FIG. 5, an embodiment of an autonomous vehicle (AV) 50 may include a vehicle body 51 housing/supporting a propulsion subsystem 52 and a power subsystem 53. The AV 50 may be fully autonomous or semi-autonomous and may optionally accommodate one or more passengers and/or one or more drivers/pilots. The propulsion subsystem 52 may include one or more of ground propulsion components, air propulsion components, marine propulsion components, and space propulsion components, or any other suitable propulsion components (e.g., cable, maglev, etc.). For example, the AV 50 may be a car, a plane, a helicopter, a boat, a drone, etc. The power subsystem 53 may include one or more batteries or electrical power sources. In some embodiments, the power subsystem may optionally include one or more additional power sources such as a gasoline or other fuel powered engine. The AV 50 may also include one or more antennas 54 coupled a radio subsystem 55, a vehicle computer 56, a GPS subsystem 57, a sensor subsystem 58, and a GPS spoofing detector 59. The components and subsystems of the AV 50 may be coupled to each in any suitable manner, including mechanically and/or electrically. Electrical components may be communicatively coupled to each other wired or wirelessly. For example, the location information from the GPS subsystem 57 may be useful for navigation and the AV 50 may rely at least partly on the location information for navigation. Although discussed primarily with the example of autonomous vehicles, some embodiments may be adapted for non-autonomous vehicles or other navigation applications (e.g., where another type of edge device may be substituted for the AV 50).

The GPS spoofing detector 59 may be configured as described in connection with any of the system 10 (FIG. 1), apparatus 20 (FIG. 2), and/or location spoofing detector 40 (FIG. 4) above (e.g., and/or may include features of the other embodiments and examples described below). In particular, the GPS spoofing detector 59 may include technology to acquire location related information (e.g., from the GPS subsystem 57, the radio subsystem 55, etc.), acquire local area characteristic information (e.g., from the sensor subsystem 58, the radio subsystem 55, etc.), and verify the location related information based on the local area characteristic information (e.g., with a trained classifier). In some embodiments, the GPS spoofing detector 59 may be physically or logically arranged as a module outside of the vehicle computer 56. Alternatively, in some embodiments all or portions of the GPS spoofing detector 59 may be implemented in or integrated with the vehicle computer 56.

For a land AV, the GPS spoofing detector 59 may utilize street fingerprinting for the detection of false GPS information. For example, driving behavior on a particular street might be similar for different drivers and may be distinct relative to other streets. Some embodiments may aggregate onboard connected vehicle sensor data for a large sample size of drivers to train a machine learning classifier to recognize the street fingerprint (e.g., the acquired local area characteristics may provide a street fingerprint which may be matched by the trained classifier to determine if the street fingerprint is consistent with the prior training data). For a marine AV, the GPS spoofing detector 59 may utilize waterway fingerprinting for the detection of false GPS information. For a marine AV, for example, the navigation behavior on a particular waterway might be similar for different navigators and may be distinct relative to other waterways (e.g., slowing down and steering around rocks or buoys). For marine environments, RSUs may be replaced with buoys, floating or underwater infrastructure, and/or other coastal connected vehicle infrastructure. For an air AV, the GPS spoofing detector 59 may utilize air space fingerprinting for the detection of false GPS information. For an air AV, for example, the navigation behavior in a particular air space might be similar for different pilots and may be distinct relative to other air spaces (e.g., slowing down and circling near airports). For air environments, the connected vehicle infrastructure may include RSUs or towers (e.g., when flying over land), buoys or floating infrastructure (e.g., when flying over water), and/or satellites.

Some embodiments may advantageously utilize non-location data from periodic vehicle-to-everything (V2X) updates to verify location and/or to detect GPS spoofing for connected cars. For example, V2X communication may provide technology to passing information between a vehicle and various entities/objects in the vicinity of the vehicle. In some systems, V2X communication may provide a vehicular communication system that may incorporate other more specific types of communication as vehicle-to-infrastructure (V2I), vehicle-to-vehicle (V2V), vehicle-to-pedestrian (V2P), vehicle-to-device (V2D), vehicle-to-grid (V2G), etc. One potential safety and security threat in modern transportation is the integrity of the GPS location information that human drivers, advanced driver-assisted systems (ADAS), and/or autonomous driving systems depend on. In some embodiments, the V2X messages may complement on-board sensing capabilities of the connected vehicles. Unfortunately, civilian GPS signals may be spoofed because the GPS signals are not authenticated. For example, off the shelf software-defined radios may mount a GPS spoofing attack. If there is a GPS spoofing attack in a neighborhood, even if the attack is not specifically targeted to a car, many GPS receivers in the proximity including cars are likely to be affected as collateral damage of the attack.

Falsified GPS coordinates may negatively impact some basic operations of autonomous driving such as route planning and navigation. In V2X communications, vehicles may send periodic status messages to communicate with other vehicles and RSUs. Some V2X applications (e.g., crash avoidance applications, platooning applications, etc.) may rely on the correctness of the data received from other cars in V2X messages, including GPS coordinates of the other cars. For example, DSRC and/or WAVE radios may broadcast basic safety messages (BSM) every 100 ms that may include the vehicle's GPS coordinates, speed, acceleration, heading, yaw rate, radius of curve of the travelled trajectory, transmission state, steering wheel angle, brake system status, etc. Each car may rely on the GPS coordinates of the other cars to calculate the trajectory of their neighbors in relation to itself and to identify potentially dangerous situations and alert drivers or take action accordingly to avoid crashes. Some embodiments may advantageously detect and/or help mitigate GPS spoofing attacks for connected cars, especially in the context of V2X applications.

Some other technology to detect GPS spoofing may include adding authentication to the GPS signal (e.g., such as may be used in some military grade GPS receivers), self-check technology within the GPS receiver to detect an abnormality in the received GPS signals (e.g., monitoring absolute or relative power of carriers, checking the Doppler shift or detecting abrupt changes, using smart antennas to detect the angle-of-arrival of each satellite signal, etc.), and/or location verification technology at a higher layer of the V2X applications such as time of flight trilateration, radio-frequency (RF) fingerprinting, radio power consumption profiling, etc. Some of these technologies may involve changes to the GPS receivers, additional communication overhead, external dependencies, and/or may not be suited to verifying GPS information received from other vehicles. Advantageously, some embodiments may use non-location specific information already contained in BSM messages exchanged between vehicles to detect GPS spoofing. The attacker cannot manipulate all values in a BSM message. For example, the non-location BSM data may be developed locally from onboard sensors. BSM communication may be subject to security provided by underlying wireless communication standards.

Data Collection Examples

Some embodiments may provide street verification technology that utilizes non-GPS derived periodic information in the V2X messages related to street characteristics (e.g., such as yaw rate, heading, and radius of curve) and driving behaviors (e.g., such as speed, accelerations) to verify if a claimant vehicle is where it claims to be or not. For example, some embodiments may collect BSMs to form a time series for each non-location field in the BSM which may then be used as training data for a machine learning network to provide a classifier to verify GPS location coordinates in real-time. Advantageously, some embodiments may verify location information based on received V2X messages without additional communication overhead. Some embodiments may advantageously detect a GPS spoofing attack without any external dependency. Some embodiments of GPS spoofing detection may be applied locally onboard in a vehicle (e.g., to self-verify the vehicle's own GPS derived coordinates, or to cross-verify GPS coordinates in a BSM received from other vehicles in the surrounding area). Some embodiments of GPS spoofing detection may be applied in infrastructure such as a RSU (e.g., to verify the GPS coordinates received from vehicles in the surrounding area). Advantageously, some embodiments may include continuous learning and/or periodic retraining to improve the performance of the GPS spoofing detection over time as more local area characteristic data is gathered.

Figure 6:
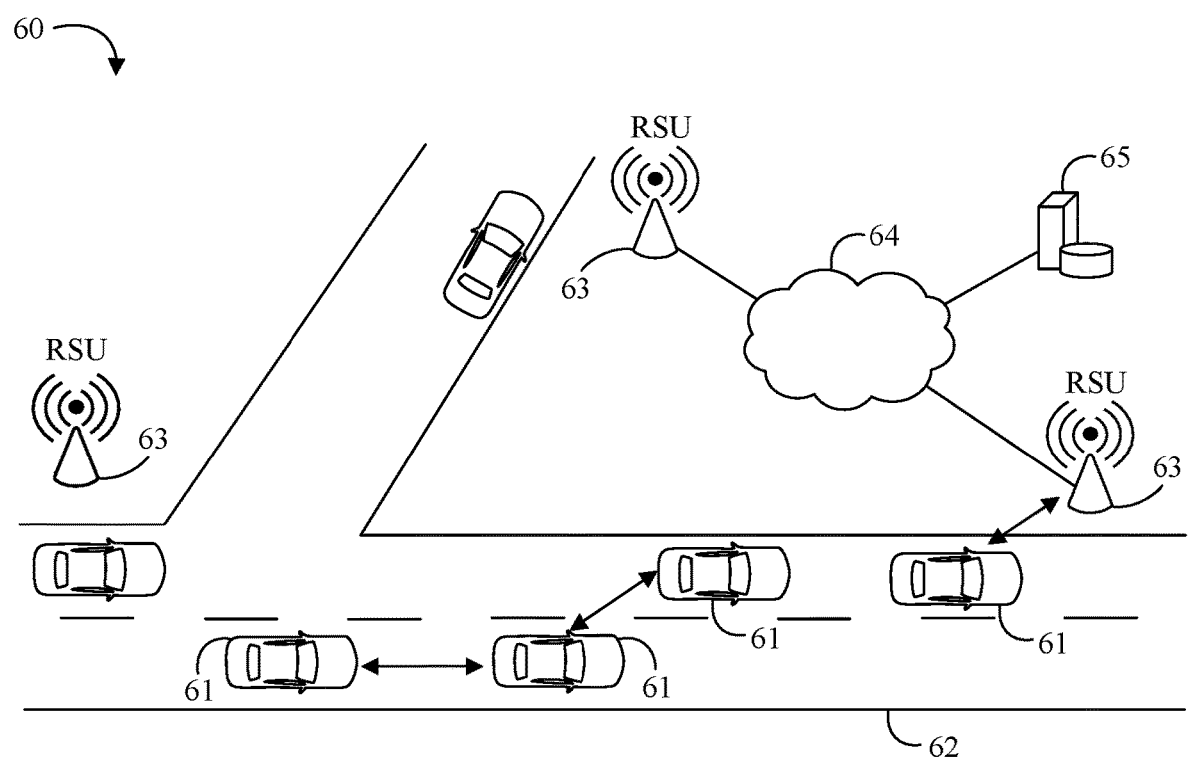
FIG. 6 is an illustrative diagram of a local area environment according to an embodiment.

Turning now to FIG. 6, an embodiment of a local area environment 60 may include a plurality of connected vehicles 61 travelling on a street 62. The environment 60 may include one or more RSUs 63, some of which may be connected to the cloud 64 and/or a server 65. The connected vehicles 61 may communicate with each other and the RSUs 63 using V2X technology. Some embodiments may advantageously utilize historic data to train a machine learning model that can verify the location provided in the V2X messages (e.g., such as BSM) using other local area characteristic fields in the V2X messages. Some embodiments may additionally or alternatively train a machine learning model to predict the identity of the street 62 based on similar information. For example, the trained classifier may be considered either binary (e.g., to verify the location) or multi-class (e.g., to identify a street). Both types of classifiers may be useful to provide a GPS spoofing detection technology to help to ensure connected cars on the road can detect the attack of GPS spoofing and invoke suitable mitigation techniques.

Connected vehicles have already been utilizing various roadways and local area characteristic data related to some of those vehicles has already been collected. For example, a large BSM dataset was collected by the University of Michigan Transportation Research Institute (UMTRI) in a Safety Pilot Model Deployment conducted between 2012 and 2015 with over 3000 cars equipped with DSRC radios to transmit and/or receive BSM messages. The dataset collected data from 4.6 million of trips around the Ann Arbor area that totaled 36.5 million km. As more connected vehicles and infrastructure are deployed on roadways, participating vehicles may continue to grow this and other datasets which may be useful in training and/or periodically retraining a location verification/identification classifier in accordance with some embodiments.

Data Pre-Processing Examples

To train a model to verify or identify a particular street, some embodiments may initially aggregate BSMs that belong to the same drive over a street segment. For example, collecting the values of each field from the sequence of BSMs transmitted as the car is driving over a segment may result in a time series of the field's variation over the time spent by the car driving on the street. Accordingly, the data points in some embodiments of a machine learning framework may be a time series of non-location related fields in the BSM, which include yaw rate, heading and radius of curve, speed and accelerations.

Training and Prediction Examples

After data pre-processing, a subset of the pre-processed data (e.g., 75%) may be used to perform the training. A machine learning model may be trained, which produces a function that can be used to determine the prediction. This function may take as input the time series of all fields (e.g., other than GPS coordinates) in the transmitted BSMs of a drive over a street and may output the prediction of the street on which the drive was taken. The prediction may then be compared with the location provided in the BSM for verification. The remaining 25% of the data may be used to evaluate the prediction performance.

Time Series Matching Examples

A street profile may include a set of profiles with each profile corresponding to a feature (e.g., such as speed). For each feature, a profile may be created by averaging over all the drives in the training set. For the prediction, Dynamic Time Warping (DTW) or Euclidean distance may be used to find the street with the closest profile to the test case. Majority vote among all features may then be utilized to determine the prediction outcome.

Feature Extraction from Time Series Examples

For each drive, the following statistics may be collected to be the features for classification: minimum observation, maximum observation, mean (e.g., arithmetic mean of all observations), standard deviation, and skew (e.g., a measure of the asymmetry about the mean). Taking these statistics for speed, heading, acceleration on x-axis (Ax), acceleration on y-axis (Ay), acceleration on z-axis (Az), yaw rate, and radius of curve results in 35 features to train the classifier. Other embodiments may use more or fewer features and/or statistics. Some embodiments may utilize random forest techniques to validate the location information at the street level granularity with both binary classification and multi-class classification.

Binary Classification for Street Verification Examples

A binary classifier may be trained for each street segment to classify a sample into "this street" versus "not this street". The classification may then be used to verify the street as matching the GPS identified street. For example, if a car's GPS coordinates indicate that it is on 7th Street, the binary classifier may use the non-GPS information to confirm if the car is actually on 7th Street. For the application of detecting GPS spoofing, some embodiments may reduce or minimize a false positive rate. A false negative may be more tolerable because there may be other complementary mechanisms to further reduce the false alarm rate, but some embodiments may be configured to not miss detecting any potential GPS spoofing.

Multi-Class Classification for Street Identification Examples

Some embodiments may utilize the same training data to train a multi-class classifier to identify a specific street within a neighborhood. Streets with a sufficiently large training set may exhibit good results with respect to identifying a specific street based only on the non-GPS information in the V2X BSM message data. As the training set increases, some embodiments may provide a multi-class classifier that may consistently provide both location verification and street identification.

Figure 7A:
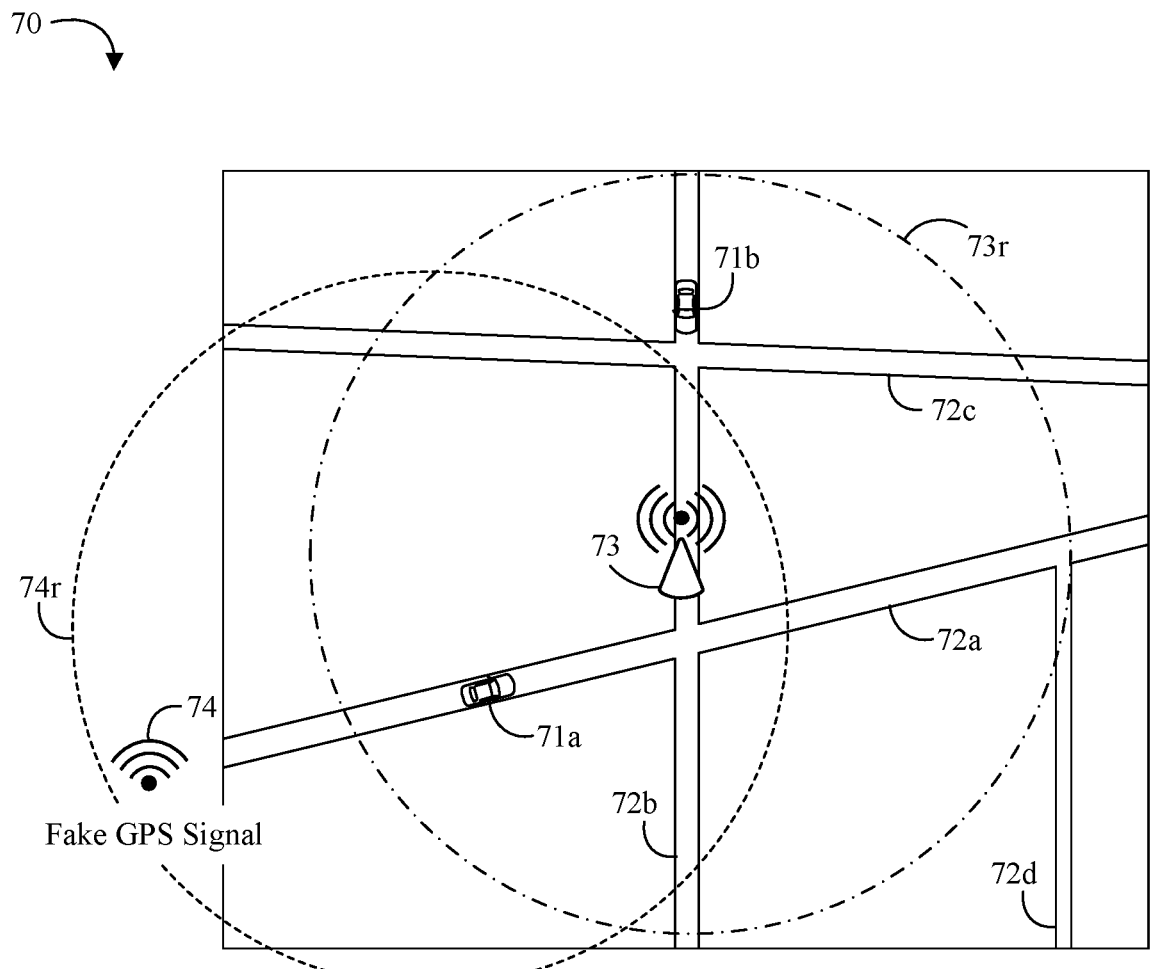
FIGS. 7A to 7C are illustrative diagrams of another local area environment according to an embodiment.
Figure 7B:
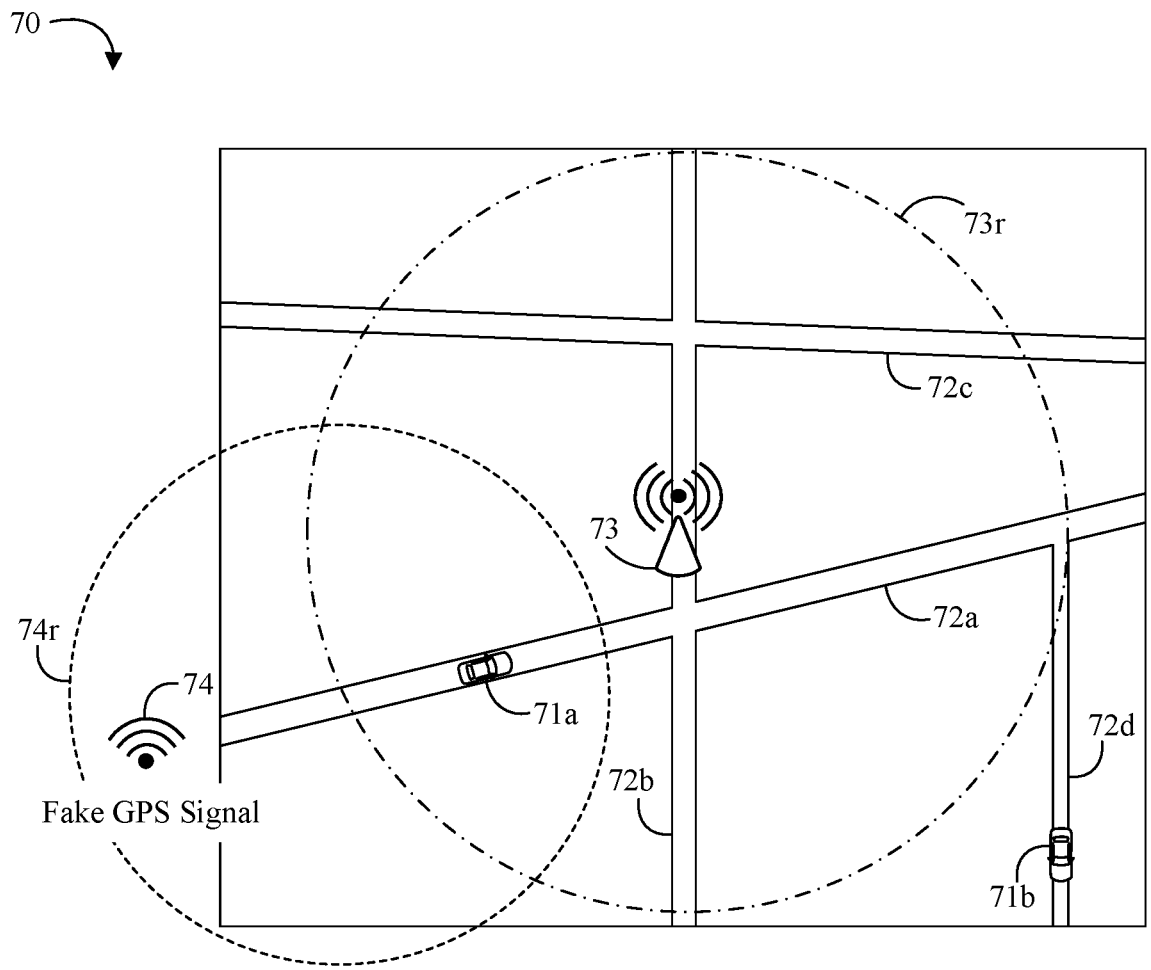
Figure 7C:
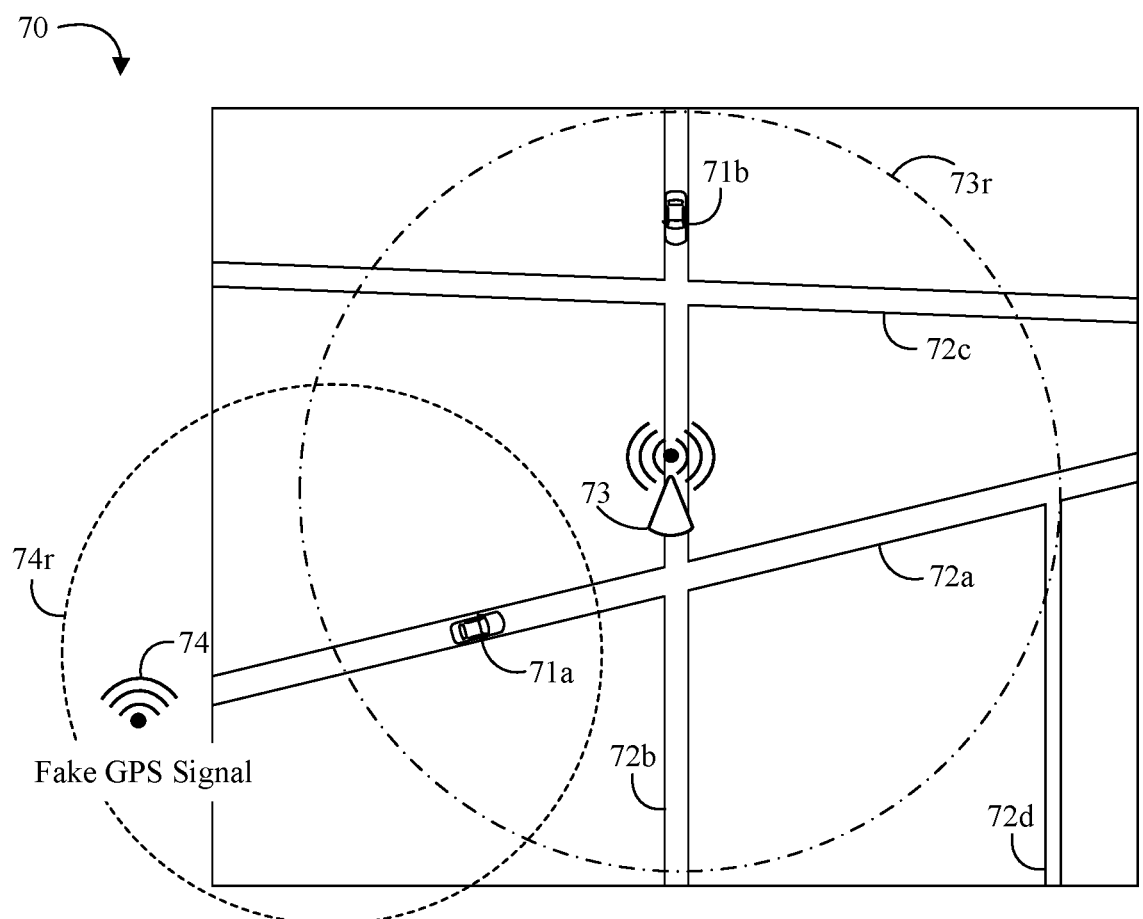

Turning now to FIGS. 7A to 7C, an embodiment of a local area environment 70 may include a plurality of connected vehicles 71a-b travelling on streets 72a-d. The environment 70 may include one or more RSUs 73, some of which may be connected to the cloud and/or a server. The connected vehicles 71a-b may communicate with each other and the RSUs 73 using V2X technology. The RSU 73 may have a range 73r, while a fake GPS signal 74 may have a range 74r. In some scenarios, the vehicle 71a and the RSU 73 may receive the fake GPS signal 74 such that they may be affected by the attack (e.g., see FIG. 7A). The RSU 73 may be configured to store its own (real) location coordinates and may compare the stored coordinates against the received fake coordinates to detect the attack, provided that the RSU 73 has its own GPS receiver. If the RSU 73 does not have own GPS receiver, it may still be able to detect GPS spoofing that happened to the cars nearby when the condition is right. For example, in FIG. 7A, the RSU 73 may also receive V2X messages from other vehicles (e.g., vehicle 71a) which are in the range 74r of the fake GPS signal 74 and so the GPS coordinates reported by 71a would be affected (i.e., become spoofed coordinates). If the spoofed coordinates of 71a is outside of the range of the radio range of RSU 73, RSU 73 would be able to detect such discrepancy as a sign of potential GPS spoofing attack affecting vehicle 71a. The RSU 73 may alert the vehicles 71a-b within its range 73r to notify them of the potential attack, including the vehicles 71a-b.

Each vehicle may still independently ascertain whether it is being affected by the GPS spoofing. For example, the vehicle 71b falls outside of the range of Fake GPS signal 74 and so its GPS coordinates should be intact, while the vehicle 71a would have its GPS coordinates compromised. So even though RSU can provide assistance to raise the potential alarm, each vehicle may still detect the real impact on its own. And then in the case whereas the spoofed coordinates of 71a falls inside the range of RSU 73 (e.g., instead of being on the street of 71a, its GPS shows being on the street of 72b), such spoofing will not be detected as anything unusual by the RSU 73. On the other hand, the vehicle 71a may advantageously include a GPS spoofing detector as described herein to independently verify its location using street fingerprinting to detect the attack (e.g., and/or to identify the street 72a), without relying on the RSU. The vehicle 71a may also receive V2X messages from the vehicle 71b with additional non-GPS data which may be provided to its GPS spoofing detector to detect the attack.

In another scenario, only the vehicle 71a may receive the fake GPS signal 74 such that it may be affected by the attack but the GPS receiver on the RSU 73 itself is not directly affected (e.g., see FIG. 7B). In this case, the RSU 73 will not be able to detect GPS spoofing by simply comparing its stored (real) GPS coordinates and the received GPS coordinates. But the RSU 73 may be receiving BSMs from vehicles with GPS coordinates outside its transmission range 73*r*, which may help the RSU 73 detect the attack and alert vehicles within the RSU range 73*r*, including the vehicle 71*a*. The vehicle 71*a* may advantageously include a GPS spoofing detector as described herein to independently verify its location using street fingerprinting to detect the attack (e.g., and/or to identify the street 72*a*).

In another scenario, only the vehicle 71*a* may receive the fake GPS signal 74 such that it may be affected by the attack (e.g., see FIG. 7C). The RSU 73 may be receiving BSMs with GPS coordinates inside its transmission range 73*r*, but the RSU 73 may include a GPS spoofing detector as described herein to run a binary classifier for the GPS data and non-GPS data in the received messages. The GPS spoofing detector in the RSU 73 may verify that the GPS-data is consistent with the non-GPS data for the vehicle 71*b*, but the GPS-data is not consistent with the non-GPS data for the vehicle 71*a*. The RSU 73 may then alert the vehicle 71*a* that it may be the subject of a GPS spoofing attack. The RSU 73 may also run a multi-class classifier to identify what street segment the vehicle 71*a* is actually on and may assist the vehicle 71*a* in mitigating the GPS spoofing attack.

Figure 8:
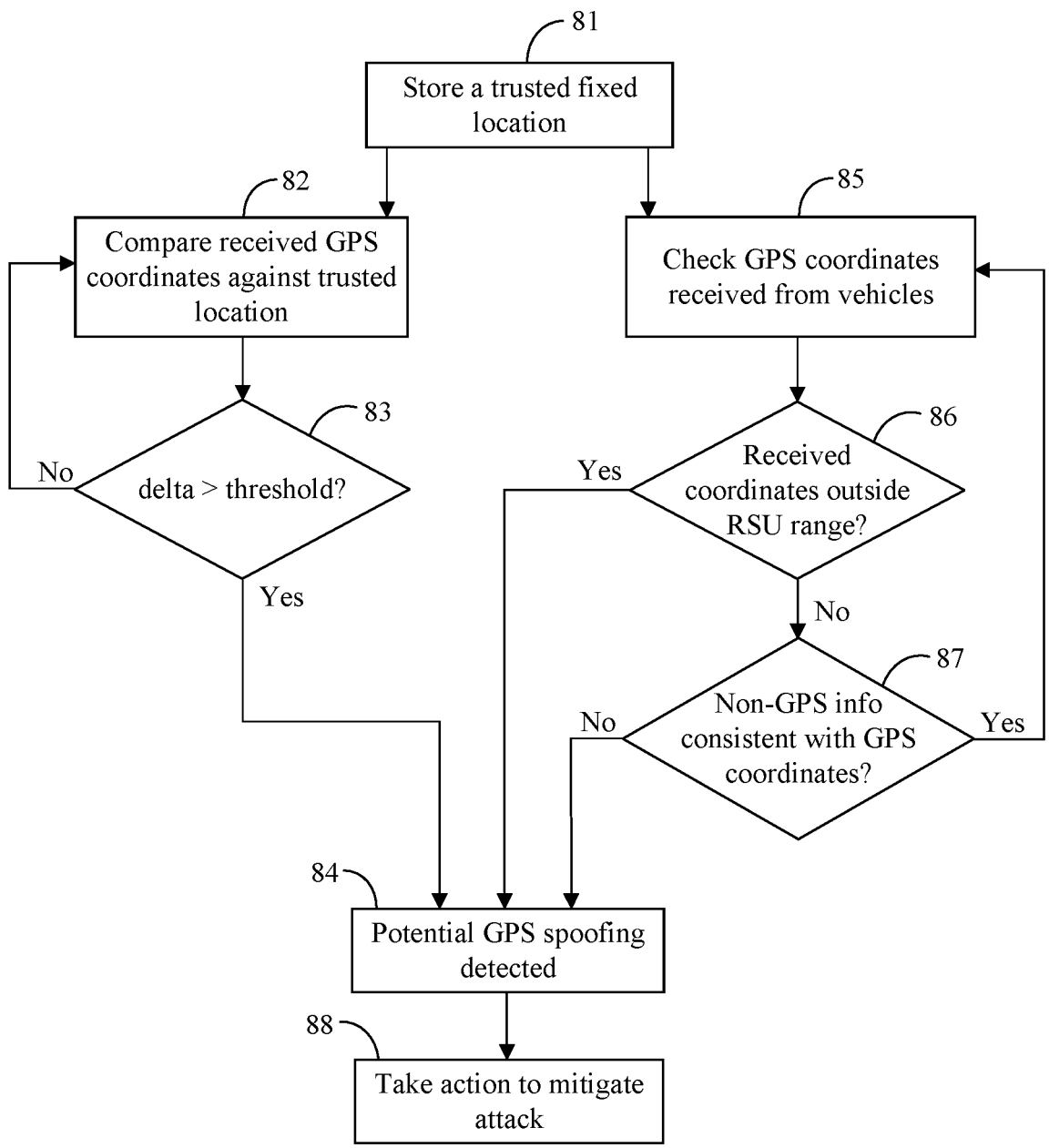
FIG. 8 is a flowchart of an example of a method of detecting GPS spoofing in a RSU according to an embodiment.

Turning now to FIG. 8, an embodiment of a method 80 of detecting GPS spoofing in a RSU may include storing a trusted fixed location at block 81, comparing received GPS coordinates against the trusted location at block 82, and determining if a delta between the two locations is larger than a threshold (e.g., based on a reasonable resolution error) at block 83. If the delta is greater than the threshold at block 84, the RSU and surrounding area may be under a GPS spoofing attack at block 84. As a double check (e.g., or if the RSU does not have its own GPS receiver, the method 80 may also include checking GPS coordinates received from any vehicles at block 85. If the reported GPS coordinates exceed the RSU's own radio receiver range at block 86, the vehicle may under GPS spoofing attack at block 84. Otherwise, the RSU may check the reported non-GPS info against the reported GPS coordinates to confirm they are consistent with each other at block 87. If the reported data is inconsistent, the vehicle may be under GPS spoofing attack at block 84. After a GPS spoofing attack is detected at block 84, the method 80 may take action to mitigate the attack at block 88 (e.g., such as notifying vehicles in the RSU's range of the attack).

Advantageously, some embodiments may utilize non-location specific information to cross check and predict the location information to detect a GPS spoofing attack. Some embodiments may utilize machine learning technology to verify and/or identify a street location based on street fingerprinting information. Some embodiments may advantageously utilize basic information that may already be available from the periodic broadcasts of connected cars participating in V2X such as BSM from DSRC equipped cars. Some embodiments may advantageously detect a GPS spoofing attack without external dependencies, and/or without additional communication overhead. Some embodiments may be applied either locally onboard in a car (e.g., to either self-verify its own GPS coordinates, or to cross-verify the GPS coordinates in the BSM received from other cars in the surrounding area), or in a RSU (e.g., to verify the GPS information received from cars in the surrounding area).

Figure 9:
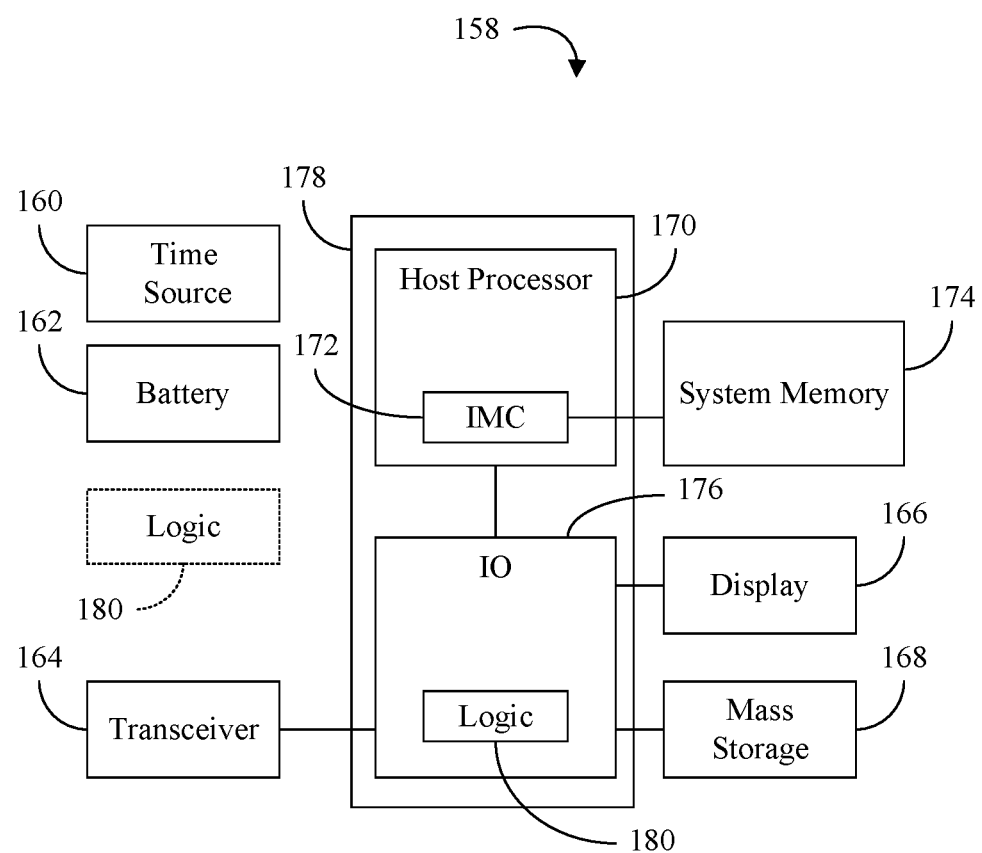
FIG. 9 is a block diagram of an example of a computing device according to an embodiment.

FIG. 9 shows a computing device 158 that may be readily substituted for one or more of the electronic processing system 10 (FIG. 1), the semiconductor package apparatus 20 (FIG. 2), the location spoofing detector 40 (FIG. 4), and/or the vehicle computer 56/the GPS spoofing detector 59 (FIG. 5), already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The IO module 176 may include logic 180 that causes the semiconductor die 178 to operate as a location spoofing detector such as, for example, the electronic processing system 10 (FIG. 1), the semiconductor package apparatus 20 (FIG. 2), the location spoofing detector 40 (FIG. 4), and/or the GPS spoofing detector 59 (FIG. 5). Thus, the logic 180 may construct a dependency database of deployed components in an environment, trace a vulnerability against the dependency database, determine one or more affected deployed components based on the trace, retrieve environment-specific rules based on the determined one or more affected deployed components, and prioritize mitigation of the vulnerability for the one or more affected deployed components based at least in part on the retrieved environment-specific rules. Additionally, the logic 180 may scan the environment to identify the deployed components, analyze the identified deployed components in the environment, and determine dependencies between the deployed components. The logic 180 may also compare data associated with the vulnerability against information in the dependency database to determine the one or more affected deployed components.

Moreover, the logic 180 may also determine a quantitative measure of usage of the one or more affected deployed components, determine a quantitative measure of exposure to internal and external attacks for the one or more affected deployed components, build a mitigation strategy on a per deployed component basis, provide a set of actions for mitigating one or more vulnerabilities in accordance with the prioritization, and/or prioritize mitigation of the vulnerability for the one or more affected deployed components based at least in part on one or more of a security-related rule, a number of users affected, a number of projects affected, a criticality of an affected project, and a number of data center sites affected. In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 10:
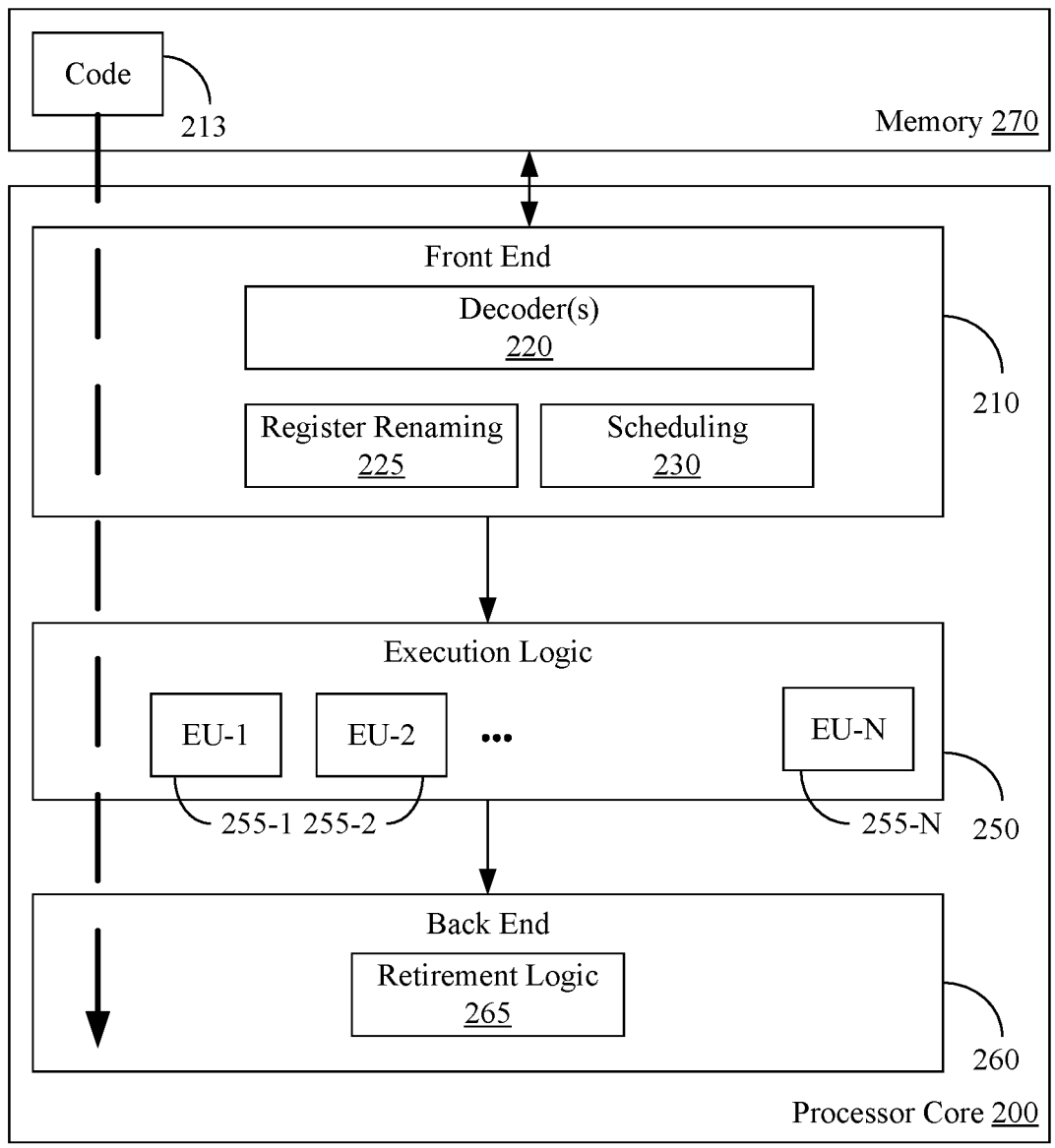
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIGS. 3A to 3C) and/or the method 80 (FIG. 8), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
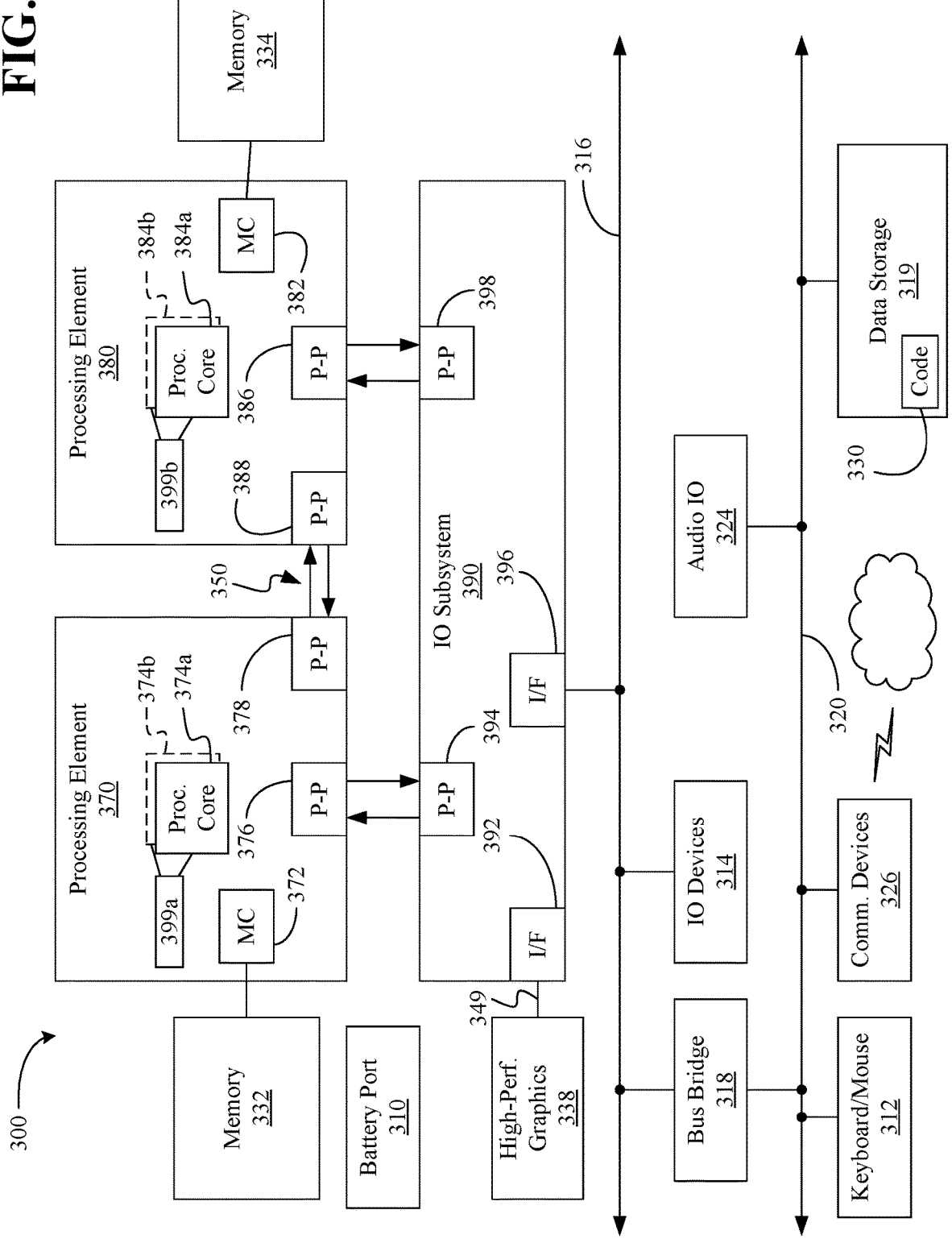
FIG. 11 is a block diagram of an example of a computing system according to an embodiment.

Referring now to FIG. 11, shown is a block diagram of a computing system 300 embodiment in accordance with an embodiment. Shown in FIG. 11 is a multiprocessor system 300 that includes a first processing element 370 and a second processing element 380. While two processing elements 370 and 380 are shown, it is to be understood that an embodiment of the system 300 may also include only one such processing element.

The system 300 is illustrated as a point-to-point interconnect system, wherein the first processing element 370 and the second processing element 380 are coupled via a point-to-point interconnect 350. It should be understood that any or all of the interconnects illustrated in FIG. 11 may be implemented as a multi-drop bus rather than point-to-point interconnect.

As shown in FIG. 11, each of processing elements 370 and 380 may be multicore processors, including first and second processor cores (i.e., processor cores 374a and 374b and processor cores 384a and 384b). Such cores 374a, 374b, 384a, 384b may be configured to execute instruction code in a manner similar to that discussed above in connection with FIG. 10.

Each processing element 370, 380 may include at least one shared cache 399a, 399b. The shared cache 399a, 399b may store data (e.g., instructions) that are utilized by one or more components of the processor, such as the cores 374a, 374b and 384a, 384b, respectively. For example, the shared cache 399a, 399b may locally cache data stored in a memory 332, 334 for faster access by components of the processor. In one or more embodiments, the shared cache 399a, 399b may include one or more mid-level caches, such as level 2 (L2), level 3 (L3), level 4 (L4), or other levels of cache, a last level cache (LLC), and/or combinations thereof.

While shown with only two processing elements 370, 380, it is to be understood that the scope of the embodiments is not so limited. In other embodiments, one or more additional processing elements may be present in a given processor. Alternatively, one or more of processing elements 370, 380 may be an element other than a processor, such as an accelerator or a field programmable gate array. For example, additional processing element(s) may include additional processors(s) that are the same as a first processor 370, additional processor(s) that are heterogeneous or asymmetric to processor a first processor 370, accelerators (such as, e.g., graphics accelerators or digital signal processing (DSP) units), field programmable gate arrays, or any other processing element. There can be a variety of differences between the processing elements 370, 380 in terms of a spectrum of metrics of merit including architectural, micro architectural, thermal, power consumption characteristics, and the like. These differences may effectively manifest themselves as asymmetry and heterogeneity amongst the processing elements 370, 380. For at least one embodiment, the various processing elements 370, 380 may reside in the same die package.

The first processing element 370 may further include memory controller logic (MC) 372 and point-to-point (P-P) interfaces 376 and 378. Similarly, the second processing element 380 may include a MC 382 and P-P interfaces 386 and 388. As shown in FIG. 11, MC's 372 and 382 couple the processors to respective memories, namely a memory 332 and a memory 334, which may be portions of main memory locally attached to the respective processors. While the MC 372 and 382 is illustrated as integrated into the processing elements 370, 380, for alternative embodiments the MC logic may be discrete logic outside the processing elements 370, 380 rather than integrated therein.

The first processing element 370 and the second processing element 380 may be coupled to an I/O subsystem 390 via P-P interconnects 376 386, respectively. As shown in FIG. 11, the I/O subsystem 390 includes P-P interfaces 394 and 398. Furthermore, I/O subsystem 390 includes an interface 392 to couple I/O subsystem 390 with a high performance graphics engine 338. In one embodiment, bus 349 may be used to couple the graphics engine 338 to the I/O subsystem 390. Alternately, a point-to-point interconnect may couple these components.

In turn, I/O subsystem 390 may be coupled to a first bus 316 via an interface 396. In one embodiment, the first bus 316 may be a Peripheral Component Interconnect (PCI) bus, or a bus such as a PCI Express bus or another third generation I/O interconnect bus, although the scope of the embodiments is not so limited.

As shown in FIG. 11, various I/O devices 314 (e.g., biometric scanners, speakers, cameras, sensors) may be coupled to the first bus 316, along with a bus bridge 318 which may couple the first bus 316 to a second bus 320. In one embodiment, the second bus 320 may be a low pin count (LPC) bus. Various devices may be coupled to the second bus 320 including, for example, a keyboard/mouse 312, communication device(s) 326, and a data storage unit 319 such as a disk drive or other mass storage device which may include code 330, in one embodiment. The illustrated code 330 may implement the method 30 (FIGS. 3A to 3C) and/or the method 80 (FIG. 8), already discussed, and may be similar to the code 213 (FIG. 10), already discussed. Further, an audio I/O 324 may be coupled to second bus 320 and a battery port 310 may supply power to the computing system 300.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Figure 12:
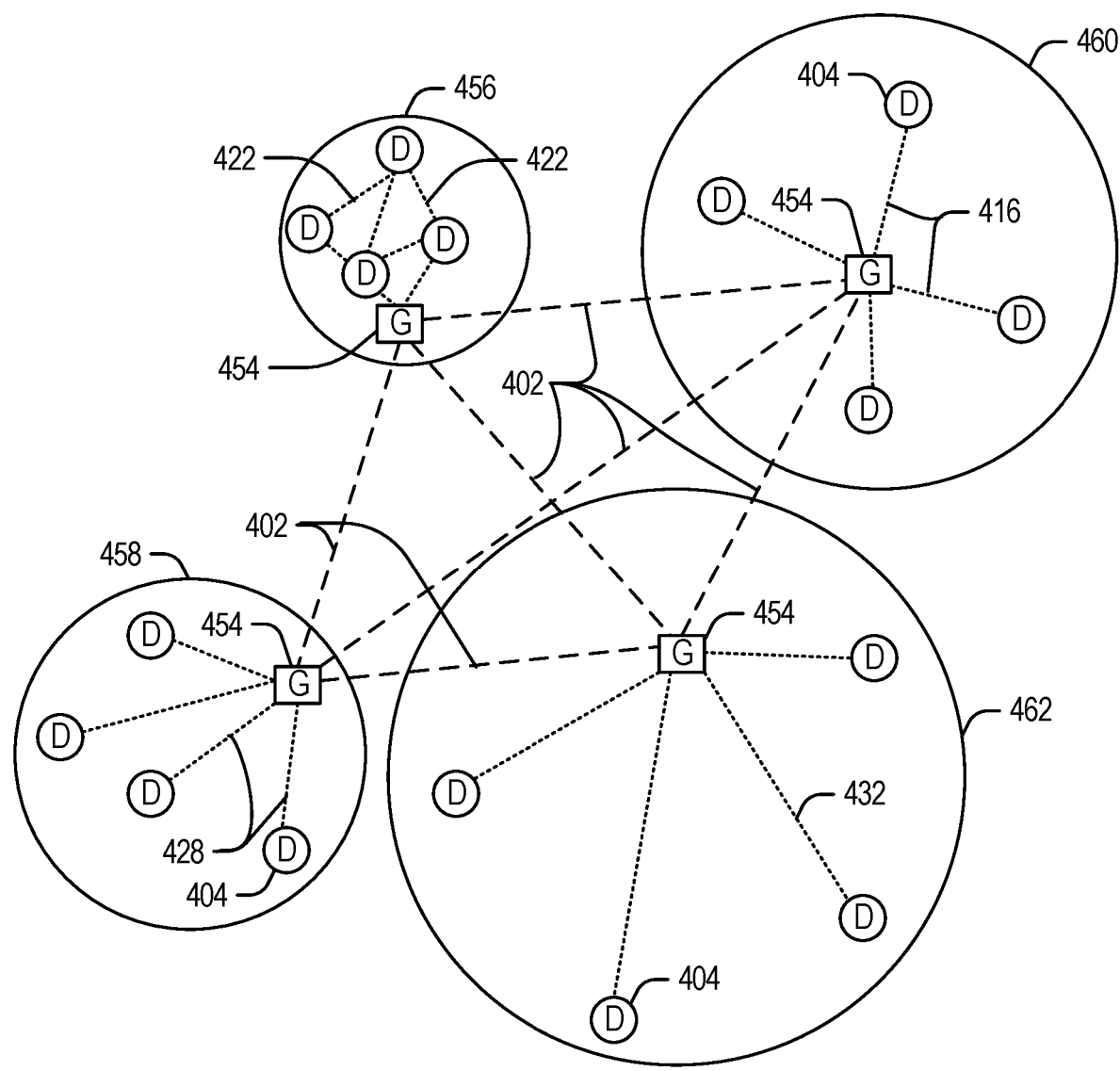
FIG. 12 illustrates a domain topology for respective internet-of-things (IoT) networks coupled through links to respective gateways, according to an example.

FIG. 12 illustrates an example domain topology for respective internet-of-things (IoT) networks coupled through links to respective gateways. For example, the domain topology of FIG. 12 may be representative of one type of network that may be used to provision and/or provide supporting information to the various embodiments described herein. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 9 and 12, present a number of new challenges in a heterogeneous network of connectivity comprising a combination of wired and wireless technologies.

FIG. 12 specifically provides a simplified drawing of a domain topology that may be used for a number of internet-of-things (IoT) networks comprising IoT devices 404, with the IoT networks 456, 458, 460, 462, coupled through backbone links 402 to respective gateways 454. For example, a number of IoT devices 404 may communicate with a gateway 454, and with each other through the gateway 454. To simplify the drawing, not every IoT device 404, or communications link (e.g., link 416, 422, 428, or 432) is labeled. The backbone links 402 may include any number of wired or wireless technologies, including optical networks, and may be part of a local area network (LAN), a wide area network (WAN), or the Internet. Additionally, such communication links facilitate optical signal paths among both IoT devices 404 and gateways 454, including the use of MUXing/deMUXing components that facilitate interconnection of the various devices.

The network topology may include any number of types of IoT networks, such as a mesh network provided with the network 456 using Bluetooth low energy (BLE) links 422. Other types of IoT networks that may be present include a wireless local area network (WLAN) network 458 used to communicate with IoT devices 404 through IEEE 802.11 (Wi-Fi®) links 428, a cellular network 460 used to communicate with IoT devices 404 through an LTE/LTE-A (4G) or 5G cellular network, and a low-power wide area (LPWA) network 462, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 404, such as over the backbone links 402, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 456, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 458, for instance, may use systems that perform standards conversion to provide multi-standard connectivity, enabling IoT devices 404 using different protocols to communicate. Further systems may provide seamless interconnectivity across a multi-standard infrastructure comprising visible Internet resources and hidden Internet resources.

Communications in the cellular network 460, for instance, may be enhanced by systems that offload data, extend communications to more remote devices, or both. The LPWA network 462 may include systems that perform non-Internet protocol (IP) to IP interconnections, addressing, and routing. Further, each of the IoT devices 404 may include the appropriate transceiver for wide area communications with that device. Further, each IoT device 404 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 13 below.

Figure 13:
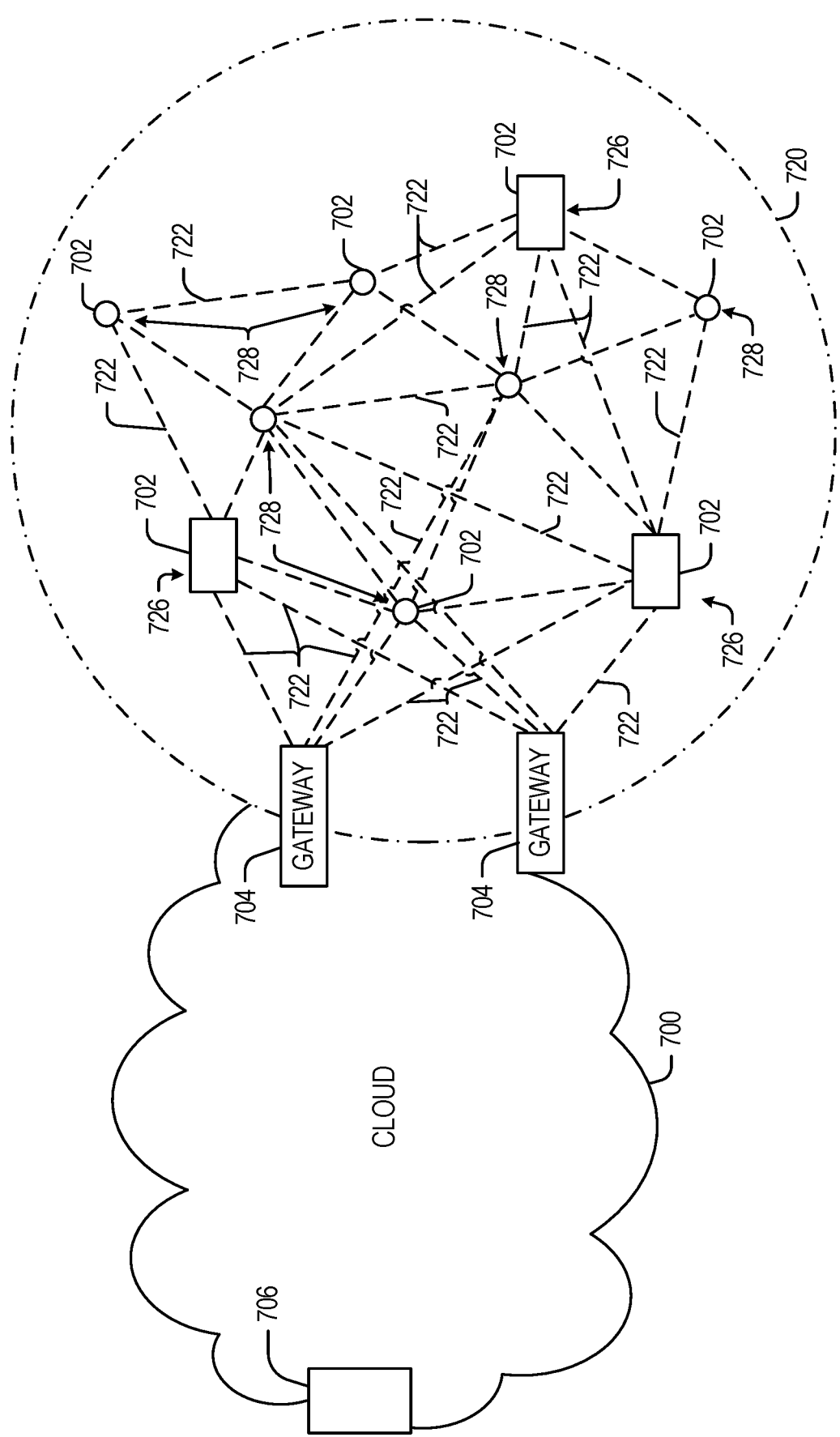
FIG. 13 illustrates a cloud computing network in communication with a mesh network of IoT devices operating as a fog device at the edge of the cloud computing network, according to an example.

FIG. 13 illustrates a cloud computing network in communication with a mesh network of IoT devices (devices 702) operating as a fog device at the edge of the cloud computing network. For example, the cloud/edge computing network of FIG. 13 may be representative of one type of network that may be used to provision and/or provide supporting information to the various embodiments described herein. The mesh network of IoT devices may be termed a fog 720, operating at the edge of the cloud 700. To simplify the diagram, not every IoT device 702 is labeled.

The fog 720 may be considered to be a massively interconnected network wherein a number of IoT devices 702 are in communications with each other, for example, by radio links 722. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 702 are shown in this example, gateways 704, data aggregators 726, and sensors 728, although any combinations of IoT devices 702 and functionality may be used. The gateways 704 may be edge devices that provide communications between the cloud 700 and the fog 720, and may also provide the backend process function for data obtained from sensors 728, such as motion data, flow data, temperature data, and the like. The data aggregators 726 may collect data from any number of the sensors 728, and perform the back end processing function for the analysis. The results, raw data, or both may be passed along to the cloud 700 through the gateways 704. The sensors 728 may be full IoT devices 702, for example, capable of both collecting data and processing the data. In some cases, the sensors 728 may be more limited in functionality, for example, collecting the data and allowing the data aggregators 726 or gateways 704 to process the data.

Communications from any IoT device 702 may be passed along a convenient path (e.g., a most convenient path) between any of the IoT devices 702 to reach the gateways 704. In these networks, the number of interconnections provide substantial redundancy, allowing communications to be maintained, even with the loss of a number of IoT devices 702. Further, the use of a mesh network may allow IoT devices 702 that are very low power or located at a distance from infrastructure to be used, as the range to connect to another IoT device 702 may be much less than the range to connect to the gateways 704.

The fog 720 provided from these IoT devices 702 may be presented to devices in the cloud 700, such as a server 706, as a single device located at the edge of the cloud 700, e.g., a fog device. In this example, the alerts coming from the fog device may be sent without being identified as coming from a specific IoT device 702 within the fog 720. In this fashion, the fog 720 may be considered a distributed platform that provides computing and storage resources to perform processing or data-intensive tasks such as data analytics, data aggregation, and machine-learning, among others.

In some examples, the IoT devices 702 may be configured using an imperative programming style, e.g., with each IoT device 702 having a specific function and communication partners. However, the IoT devices 702 forming the fog device may be configured in a declarative programming style, allowing the IoT devices 702 to reconfigure their operations and communications, such as to determine needed resources in response to conditions, queries, and device failures. As an example, a query from a user located at a server 706 about the operations of a subset of equipment monitored by the IoT devices 702 may result in the fog 720 device selecting the IoT devices 702, such as particular sensors 728, needed to answer the query. The data from these sensors 728 may then be aggregated and analyzed by any combination of the sensors 728, data aggregators 726, or gateways 704, before being sent on by the fog 720 device to the server 706 to answer the query. In this example, IoT devices 702 in the fog 720 may select the sensors 728 used based on the query, such as adding data from flow sensors or temperature sensors. Further, if some of the IoT devices 702 are not operational, other IoT devices 702 in the fog 720 device may provide analogous data, if available.

In other examples, the operations and functionality described above with reference to FIGS. 1 to 8 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 14:
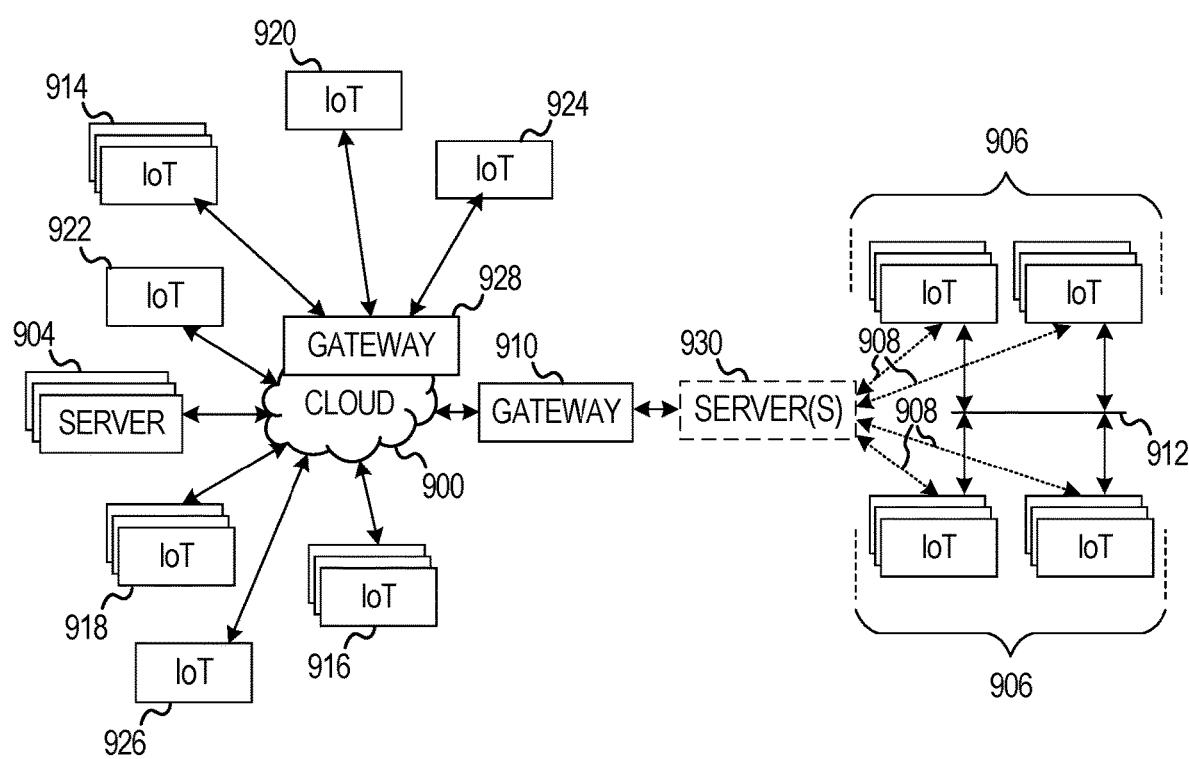
FIG. 14 illustrates a block diagram of a network illustrating communications among a number of IoT devices, according to an example.

FIG. 14 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. For example, the cloud/IoT computing network of FIG. 14 may be representative of one type of network that may be used to provision and/or provide supporting information to the various embodiments described herein. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 13), or a combination therein. The groups of IoT devices may be deployed in various residential, commercial, and industrial settings (including in both private or public environments).

As can be seen from FIG. 14, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 13).

Figure 15:
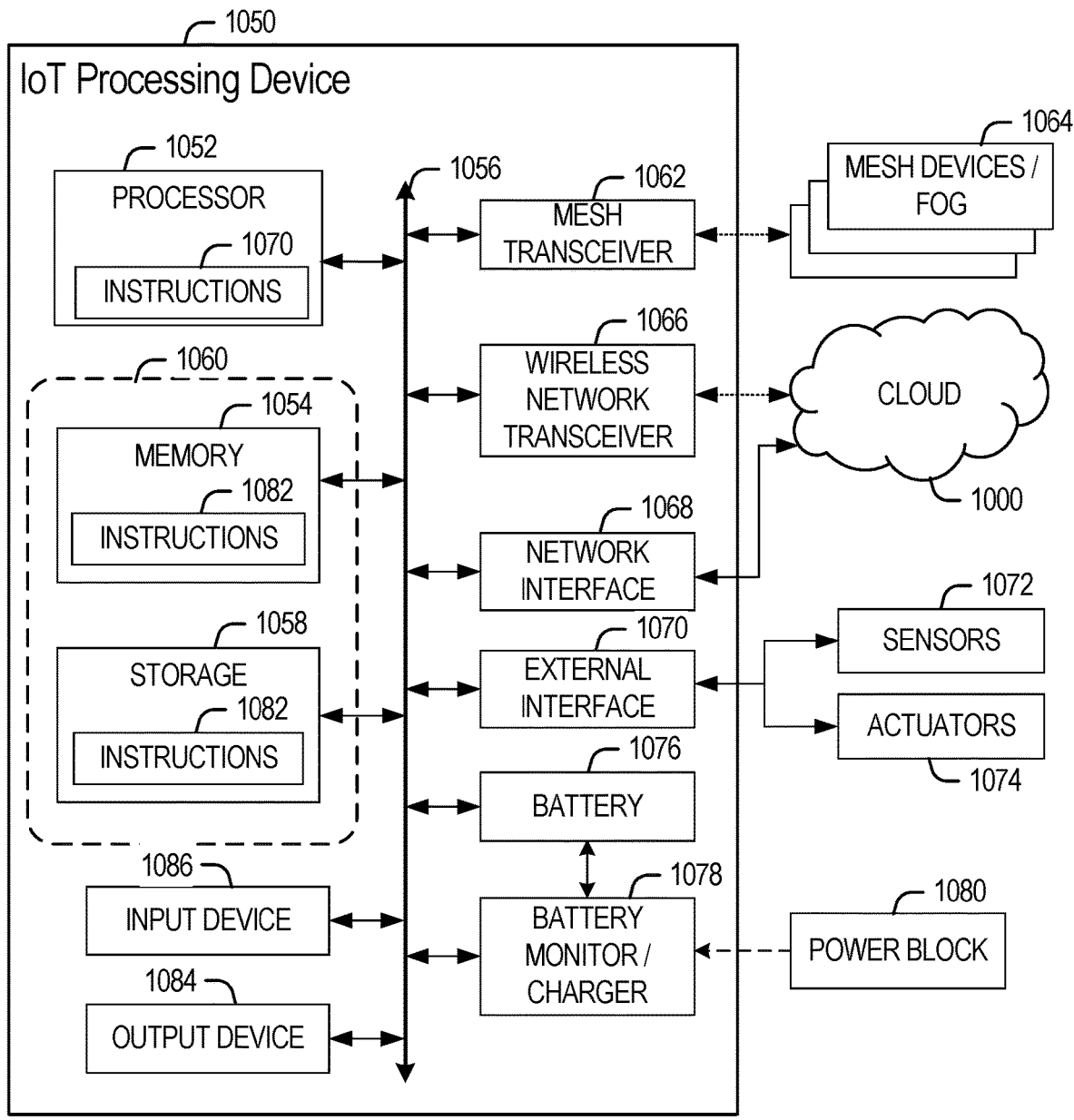
FIG. 15 illustrates a block diagram for an example IoT processing system architecture upon which any one or more of the techniques (e.g., operations, processes, methods, and methodologies) discussed herein may be performed, according to an example.

FIG. 15 is a block diagram of an example of components that may be present in an IoT device 1050 for implementing the techniques described herein. For example, the components of the IoT device 1050 and other components of FIG. 15 may be representative of the types of components that may be found in autonomous vehicles and/or distributed 3D video systems according to the various embodiments described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 15 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element.

The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™ an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, etc. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depends on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 15 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

ADDITIONAL NOTES AND EXAMPLES

Example 1 may include an electronic processing system, comprising a processor, memory communicatively coupled to the processor, and logic communicatively coupled to the processor to acquire location related information, acquire local area characteristic information, and verify the location related information based on the local area characteristic information.

Example 2 may include the system of Example 1, wherein the logic is further to acquire the local area characteristic information from one or more of a local source and an external source.

Example 3 may include the system of Example 1, wherein the logic is further to receive a message from an external source, and extract the local area characteristic information from the received message.

Example 4 may include the system of Example 1, wherein the logic is further to provide the location related information and the local area characteristic information to a trained classifier to verify the location related information based on the local area characteristic information.

Example 5 may include the system of any of Examples 1 to 4, wherein the local area characteristic information includes one or more of street characteristic information and vehicle behavior information.

Example 6 may include the system of Example 5, wherein the street characteristic information includes one or more of yaw rate, heading, and radius of curve, and wherein the vehicle behavior information includes one or more of speed and acceleration.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to acquire location related information, acquire local area characteristic information, and verify the location related information based on the local area characteristic information.

Example 8 may include the apparatus of Example 7, wherein the logic is further to acquire the local area characteristic information from one or more of a local source and an external source.

Example 9 may include the apparatus of Example 7, wherein the logic is further to receive a message from an external source, and extract the local area characteristic information from the received message.

Example 10 may include the apparatus of Example 7, wherein the logic is further to provide the location related information and the local area characteristic information to a trained classifier to verify the location related information based on the local area characteristic information.

Example 11 may include the apparatus of any of Examples 7 to 10, wherein the local area characteristic information includes one or more of street characteristic information and vehicle behavior information.

Example 12 may include the apparatus of Example 11, wherein the street characteristic information includes one or more of yaw rate, heading, and radius of curve, and wherein the vehicle behavior information includes one or more of speed and acceleration.

Example 13 may include the apparatus of Example 7, wherein the logic coupled to the one or more substrates includes transistor channel regions that are positioned within the one or more substrates.

Example 14 may include a method of verifying a location, comprising acquiring location related information, acquiring local area characteristic information, and verifying the location related information based on the local area characteristic information.

Example 15 may include the method of Example 14, further comprising acquiring the local area characteristic information from one or more of a local source and an external source.

Example 16 may include the method of Example 14, further comprising receiving a message from an external source, and extracting the local area characteristic information from the received message.

Example 17 may include the method of Example 14, further comprising providing the location related information and the local area characteristic information to a trained classifier to verify the location related information based on the local area characteristic information.

Example 18 may include the method of any of Examples 14 to 17, wherein the local area characteristic information includes one or more of street characteristic information and vehicle behavior information.

Example 19 may include the method of Example 18, wherein the street characteristic information includes one or more of yaw rate, heading, and radius of curve, and wherein the vehicle behavior information includes one or more of speed and acceleration.

Example 20 may include at least one computer readable medium, comprising a set of instructions, which when executed by a computing device, cause the computing device to acquire location related information, acquire local area characteristic information, and verify the location related information based on the local area characteristic information.

Example 21 may include the at least one computer readable medium of Example 20, comprising a further set of instructions, which when executed by the computing device, cause the computing device to acquire the local area characteristic information from one or more of a local source and an external source.

Example 22 may include the at least one computer readable medium of Example 20, comprising a further set of instructions, which when executed by the computing device, cause the computing device to receive a message from an external source, and extract the local area characteristic information from the received message.

Example 23 may include the at least one computer readable medium of Example 20, comprising a further set of instructions, which when executed by the computing device, cause the computing device to provide the location related information and the local area characteristic information to a trained classifier to verify the location related information based on the local area characteristic information.

Example 24 may include the at least one computer readable medium of any of Examples 20 to 23, wherein the local area characteristic information includes one or more of street characteristic information and vehicle behavior information.

Example 25 may include the at least one computer readable medium of Example 24, wherein the street characteristic information includes one or more of yaw rate, heading, and radius of curve, and wherein the vehicle behavior information includes one or more of speed and acceleration.

Example 26 may include a location verification apparatus, comprising means for acquiring location related information, means for acquiring local area characteristic information, and means for verifying the location related information based on the local area characteristic information.

Example 27 may include the apparatus of Example 26, further comprising means for acquiring the local area characteristic information from one or more of a local source and an external source.

Example 28 may include the apparatus of Example 26, further comprising means for receiving a message from an external source, and means for extracting the local area characteristic information from the received message.

Example 29 may include the apparatus of Example 26, further comprising means for providing the location related information and the local area characteristic information to a trained classifier to verify the located related information based on the local area characteristic information.

Example 30 may include the apparatus of any of Examples 26 to 29, wherein the local area characteristic information includes one or more of street characteristic information and vehicle behavior information.

Example 31 may include the apparatus of Example 30, wherein the street characteristic information includes one or more of yaw rate, heading, and radius of curve, and wherein the vehicle behavior information includes one or more of speed and acceleration.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   memory communicatively coupled to the processor; and
   logic communicatively coupled to the processor to:
   electronically acquire first location related information from a first source,
   electronically acquire local area characteristic information,
   electronically acquire, via a receiver, second location related information from an external vehicle,
   automatically verify whether the first location related information is accurate based on the local area characteristic information and on a pre-stored trusted location,
   automatically verify whether the second location related information is accurate based on a reception range of the receiver, and
   when the accuracy of the first location related information or of the second location related information is not verified, notify the external vehicle of a potential location spoofing attack,
   wherein to verify whether the second location related information is accurate, the logic is to determine whether the second location related information identifies a location for the external vehicle outside of the reception range of the receiver, wherein a determination that the location for the external vehicle lies outside of the reception range of the receiver indicates that the second location related information is not accurate.

2. The system of claim 1, wherein the logic is further to:
   acquire the local area characteristic information from one or more of a local source and an external source.

3. The system of claim 1, wherein the logic is further to:
   receive a message from an external source; and
   extract the local area characteristic information from the received message.

4. The system of claim 1, wherein the logic is further to:
   provide the first location related information and the local area characteristic information to a trained classifier to verify the first location related information based on the local area characteristic information.

5. The system of claim 1, wherein the local area characteristic information includes one or more of street characteristic information, the street characteristic information comprising one or more of yaw rate, heading, or radius of curve, or vehicle behavior information, the vehicle behavior information comprising one or more of speed or acceleration.

6. The system of claim 1, wherein to verify whether the first location related information is accurate, the logic is to:
   compare the first location related information to the pre-stored trusted location, and
   determine whether a difference between the first location related information and the pre-stored trusted location exceeds a threshold.

7. A semiconductor package apparatus, comprising:
   one or more substrates; and
   logic coupled to the one or more substrates, wherein the logic is at least partly implemented in one or more of configurable logic and fixed-functionality hardware logic, the logic coupled to the one or more substrates to:
   electronically acquire first location related information from a first source,
   electronically acquire local area characteristic information,
   electronically acquire, via a receiver, second location related information from an external vehicle,
   automatically verify whether the first location related information is accurate based on the local area characteristic information and on a pre-stored trusted location,
   automatically verify whether the second location related information is accurate based on a reception range of the receiver, and
   when the accuracy of the first location related information or of the second location related information is not verified, notify the external vehicle of a potential location spoofing attack,
   wherein to verify whether the second location related information is accurate, the logic is to determine whether the second location related information identifies a location for the external vehicle outside of the reception range of the receiver, wherein a determination that the location for the external vehicle lies outside of the reception range of the receiver indicates that the second location related information is not accurate.

8. The apparatus of claim 7, wherein the logic is further to:
   acquire the local area characteristic information from one or more of a local source and an external source.

9. The apparatus of claim 7, wherein the logic is further to:
   receive a message from an external source; and
   extract the local area characteristic information from the received message.

10. The apparatus of claim 7, wherein the logic is further to:
    provide the first location related information and the local area characteristic information to a trained classifier to verify the first location related information based on the local area characteristic information.

11. The apparatus of claim 7, wherein the local area characteristic information includes one or more of street characteristic information, the street characteristic information comprising one or more of yaw rate, heading, or radius of curve, or vehicle behavior information, the vehicle behavior information comprising one or more of speed or acceleration.

12. The apparatus of claim 7, wherein to verify whether the first location related information is accurate, the logic coupled to the one or more substrates is to:
    compare the first location related information to the pre-stored trusted location, and
    determine whether a difference between the first location related information and the pre-stored trusted location exceeds a threshold.

13. The apparatus of claim 7, wherein the logic coupled to the one or more substrates includes transistor channel regions that are positioned within the one or more substrates.

14. A method of verifying a location, comprising:
    electronically acquiring first location related information from a first source,
    electronically acquiring local area characteristic information,
    electronically acquiring, via a receiver, second location related information from an external vehicle,
    automatically verifying whether the first location related information is accurate based on the local area characteristic information and on a pre-stored trusted location, automatically verifying whether the second location related information is accurate based on a reception range of the receiver, and
when the accuracy of the first location related information or of the second location related information is not verified, notifying the external vehicle of a potential location spoofing attack,
wherein verifying whether the second location related information is accurate comprises determining whether the second location related information identifies a location for the external vehicle outside of the reception range of the receiver, wherein a determination that the location for the external vehicle lies outside of the reception range of the receiver indicates that the second location related information is not accurate.

15. The method of claim 14, further comprising:
acquiring the local area characteristic information from one or more of a local source and an external source.

16. The method of claim 14, further comprising:
receiving a message from an external source; and
extracting the local area characteristic information from the received message.

17. The method of claim 14, further comprising:
providing the first location related information and the local area characteristic information to a trained classifier to verify the first location related information based on the local area characteristic information.

18. The method of claim 14, wherein the local area characteristic information includes one or more of street characteristic information, the street characteristic information comprising one or more of yaw rate, heading, or radius of curve, or vehicle behavior information, the vehicle behavior information comprising one or more of speed or acceleration.

19. The method of claim 14, wherein verifying whether the first location related information is accurate comprises:
comparing the first location related information to the pre-stored trusted location; and
determining whether a difference between the first location related information and the pre-stored trusted location exceeds a threshold.

20. At least one non-transitory computer readable medium, comprising a set of instructions, which when executed by a computing device, cause the computing device to:
electronically acquire first location related information from a first source,
electronically acquire local area characteristic information,
electronically acquire, via a receiver, second location related information from an external vehicle,
automatically verify whether the first location related information is accurate based on the local area characteristic information and on a pre-stored trusted location,
automatically verify whether the second location related information is accurate based on a reception range of the receiver, and
when the accuracy of the first location related information or of the second location related information is not verified, notify the external vehicle of a potential location spoofing attack,
wherein to verify whether the second location related information is accurate, the instructions, when executed, cause the computing device to determine whether the second location related information identifies a location for the external vehicle outside of the reception range of the receiver, wherein a determination that the location for the external vehicle lies outside of the reception range of the receiver indicates that the second location related information is not accurate.

21. The at least one non-transitory computer readable medium of claim 20, comprising a further set of instructions, which when executed by the computing device, cause the computing device to:
acquire the local area characteristic information from one or more of a local source and an external source.

22. The at least one non-transitory computer readable medium of claim 20, comprising a further set of instructions, which when executed by the computing device, cause the computing device to:
receive a message from an external source; and
extract the local area characteristic information from the received message.

23. The at least one non-transitory computer readable medium of claim 20, comprising a further set of instructions, which when executed by the computing device, cause the computing device to:
provide the first location related information and the local area characteristic information to a trained classifier to verify the first location related information based on the local area characteristic information.

24. The at least one non-transitory computer readable medium of claim 20, wherein the local area characteristic information includes one or more of street characteristic information, the street characteristic information comprising one or more of yaw rate, heading, or radius of curve, or vehicle behavior information, the vehicle behavior information comprising one or more of speed or acceleration.

25. The at least one non-transitory computer readable medium of claim 20, wherein to verify whether the first location related information is accurate, the instructions, when executed, cause the computing device to:
compare the first location related information to the pre-stored trusted location; and
determine whether a difference between the first location related information and the pre-stored trusted location exceeds a threshold.

\* \* \* \* \*